(12) United States Patent
Lu et al.

(10) Patent No.: US 11,179,781 B2
(45) Date of Patent: Nov. 23, 2021

(54) METHOD OF MAKING COLLOIDAL PLATINUM NANOPARTICLES

(71) Applicant: Tripod Nano Technology Corporation, Taoyuan (TW)

(72) Inventors: Lin Lu, Taoyuan (TW); Kuei-Sheng Fan, New Taipei (TW); Chun-Lun Chiu Chiu, Pingtung County (TW); Han-Wu Yen, Taoyuan (TW); Hao-Chan Hsu, Hsinchu (TW); Chia-Yi Lin, Taichung (TW); Chi-Jiun Peng, Taipei (TW); Cheng-Ding Wang, Taoyuan (TW); Jim-Min Fang, Taipei (TW)

(73) Assignee: TRIPOD NANO TECHNOLOGY CORPORATION, Taoyuan (TW)

( * ) Notice: Subject to any disclaimer, the term of this patent is extended or adjusted under 35 U.S.C. 154(b) by 359 days.

(21) Appl. No.: 16/392,242

(22) Filed: Apr. 23, 2019

(65) Prior Publication Data
US 2020/0114429 A1 Apr. 16, 2020

(30) Foreign Application Priority Data

Oct. 15, 2018 (TW) ................. 107136250

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0022* (2013.01); *B22F 1/0088* (2013.01);
(Continued)

(58) Field of Classification Search
CPC .............................. B22F 9/24; B22F 2009/245
See application file for complete search history.

(56) References Cited

U.S. PATENT DOCUMENTS 3,992,512 A * 11/1976 Petrow ..................... B01J 23/42
423/512.1
4,059,541 A * 11/1977 Petrow ..................... B01J 23/40
516/88
(Continued)

FOREIGN PATENT DOCUMENTS

CA 3045348 A1 5/2018
CN 103288147 A * 9/2013
(Continued)

OTHER PUBLICATIONS

DeDietrich; "HCl Treatment", 2017, retrieved from wayback machine on Jun. 2, 2021; https://www.dedietrich.com/en/solutions-and-products/mineral-acid-treatment/hydrochloric-acid-treatment/absorption-hcl (Year: 2017).*
(Continued)

*Primary Examiner* — Alexandra M Moore
*Assistant Examiner* — Austin Pollock
(74) *Attorney, Agent, or Firm* — Sinorica, LLC

(57) ABSTRACT

Provided is a method of making colloidal platinum nanoparticles. The method includes three consecutive steps: dissolving platinum powders by a halogen-containing oxidizing agent in HCl to obtain an inorganic platinum solution containing an inorganic platinum compound; adding a reducing agent into the same reaction vessel to form a mixture solution and heating the mixture solution to undergo a reduction reaction and produce a composition containing
(Continued)

platinum nanoparticles, residues and a gas, and guiding the gas out of the reaction vessel, wherein the amount of the residues is less than 15% by volume of the mixture solution; and adding a medium into the same reaction vessel to disperse the platinum nanoparticles to obtain colloidal platinum nanoparticles. The method is simple, safe, time-effective, cost-effective, and has the advantage of high yield.

14 Claims, 18 Drawing Sheets

(51) Int. Cl.
*B82Y 30/00* (2011.01)
*B82Y 40/00* (2011.01)

(52) U.S. Cl.
CPC ... *B22F 2001/0092* (2013.01); *B22F 2301/25* (2013.01); *B22F 2304/054* (2013.01); *B82Y 30/00* (2013.01); *B82Y 40/00* (2013.01)

(56) References Cited

U.S. PATENT DOCUMENTS

| | | | | |
|---|---|---|---|---|
| 5,332,646 | A * | 7/1994 | Wright | G03G 9/12 427/304 |
| 6,699,507 | B1 | 3/2004 | Albrecht | |
| 2005/0186129 | A1 * | 8/2005 | Miyashita | B82Y 30/00 423/22 |
| 2006/0105910 | A1 * | 5/2006 | Zhou | B01J 37/0211 502/338 |
| 2007/0219083 | A1 * | 9/2007 | Zhang | B22F 1/0022 502/150 |
| 2007/0290175 | A1 * | 12/2007 | Kim | B22F 1/025 252/500 |
| 2017/0304805 | A1 | 10/2017 | Xu et al. | |

FOREIGN PATENT DOCUMENTS

| | | | | |
|---|---|---|---|---|
| CN | 103341636 | A | 10/2013 | |
| CN | 105195732 | A | 12/2015 | |
| CN | 106669662 | | 5/2017 | |
| CN | 106670503 | | 5/2017 | |
| CN | 106963658 | | 7/2017 | |
| EP | 3539655 | A1 * | 9/2019 | B01J 31/06 |
| JP | 2004100040 | A * | 4/2004 | |
| JP | 2007302944 | A | 11/2007 | |
| JP | 2008189967 | A * | 8/2008 | |
| JP | 2014173107 | A | 9/2014 | |
| JP | 2018-35427 | | 3/2018 | |
| TW | 201343248 | A | 11/2013 | |

OTHER PUBLICATIONS

Gold Refining Forum; "Refluxing Condenser Set-up", 2012, retrieved Jun. 4, 2021; https://goldrefiningforum.com/phpBB3/viewtopic.php?t=15979 (Year: 2012).*

Xia Qin et al. Synthesis of platinum nanoparticles stabilized in polyvinyl alcohol and their electrocatalytic properties. Aug. 30, 2011.

Nguyen, T. B. et al. Preparation of platinum nanoparticles in liquids by laser ablation method. Aug. 12, 2014.

Pedon, D. et al. Platinum nanoparticles in nanobiomedicine. Aug. 2017.

* cited by examiner

METHOD OF MAKING COLLOIDAL PLATINUM NANOPARTICLES

CROSS-REFERENCE TO RELATED APPLICATION

Pursuant to 35 U.S.C. § 119(a), this application claims the benefit of the priority to Taiwan Patent Application No. 107136250 filed on Oct. 15, 2018. The content of the prior application is incorporated herein by its entirety.

BACKGROUND OF THE INVENTION

1. Field of the Invention

The present disclosure relates to a method of making colloidal metal nanoparticles, and particularly to a method of making colloidal platinum nanoparticles.

2. Description of the Prior Arts

Platinum nanoparticles are widely used in different fields because of their unique optical, physical and chemical properties, such fields of applications including nanocatalysts in materials science, fuel cells in electrochemistry, fast screening tests, bio-imagings and beauty products in bio-medical technology, and a matrix for surface enhanced Raman spectroscopy (SERS) in the field of analytical testing.

According to the paper "Platinum nanoparticles in nano-biomedicine" by Pedone, D. et al. in *Chemical Society Reviews*, Vol. 46 beginning on page 4951 (2017), the methods for making platinum nanoparticles can be divided into three major categories: (1) physical methods such as laser ablation method, which uses high-energy laser for continuous irradiation on a platinum metal bulk material to evaporate platinum metal atoms, and then condensates to produce platinum nanoparticles; (2) chemical methods such as chemical vapor synthesis which condenses vaporized organoplatinum materials for reaggregating to platinum nanoparticles, and chemical reduction method, the method most widely used, which reduces platinum ions to platinum nanoparticles by a reducing agent in an aqueous solution or organic solvent; and (3) bio-assisted methods such as using the extracts of bacteria, fungi, enzymes or plants to reduce platinum ions to platinum nanoparticles.

Having large specific surface areas, platinum nanoparticles display high physical and chemical activities for easy oxidation and agglomeration. Thus, a variety of modifiers or capping agents are often introduced in the chemical reduction method of making platinum nanoparticles for control of the particle size, shape, distribution, dispersion stability and surface chemical property. However, variable reagent combinations and different optimization conditions make the making process become more complicated and have difficulties in controlling the qualities of the products, so it is not beneficial for mass production. That is, the technology for making colloidal platinum nanoparticles has a great influence on the stability and quality of the product.

As shown in FIG. 2, the conventional methods for making colloidal platinum nanoparticles require preparing chloroplatinic acid or chloroplatinate salts from platinum metal first. Because their oxidation method used cannot directly obtain highly pure chloroplatinic acid or chloroplatinate salts, they should include refining procedures to obtain the raw materials for making colloidal platinum nanoparticles. After obtaining refined chloroplatinic acid or chloroplatinic salts, it is then combined with a mixture of different stabilizers, reducing agents and dispersing agents in a single container to complete the production and colloidalization of platinum nanoparticles in a high temperature environment. Therefore, the products of colloidal platinum nanoparticles are confined to fixed solvents, stabilizers and dispersants.

U.S. Pat. No. 6,699,507 discloses a method for making colloidal platinum nanoparticles. The method uses an ascorbic acid, a citric acid or a tannic acid as a reducing agent, as well as a stabilizer and a dispersant. The chloroplatinic acid ($H_2PtCl_6$) is directly converted into colloidal platinum nanoparticles in a single vessel.

US Patent Publication 2017/0304805 discloses a method for making colloidal platinum nanoparticles, which adds a reducing agent (e.g. ascorbic acid) and a suspension stabilizing agent (e.g. polyvinylpyrrolidone, PVP) simultaneously to get less available platinum precursors such as monoethanolamine Pt(IV) hexahydroxide, thereby making colloidal platinum nanoparticles.

China Patent Publication 106963658 discloses a method for making colloidal platinum nanoparticles by using potassium chloroplatinate, potassium bromide and PVP, which makes potassium chloroplatinate directly converted to colloidal platinum nanoparticles.

China Patent Publication 106670503 discloses a method for making colloidal platinum-copper nanoparticles. The method uses less available platinum acetylacetonate as a raw material, which is dissolved in an organic solvent having reducing and dispersing abilities such as oleyl amine, and introduces a reducing gas such as hydrogen gas or carbon monoxide into said organic solvent, and then completes the production and colloidization of platinum-copper nanoparticles at a temperature of over 200° C. The method restricts the choice of dispersants and the application scopes of the products because of using an organic solvent as the dispersant and the solvent. Besides, the use of explosive hydrogen gas or biologically toxic carbon monoxide as the reducing agent has application limitations and safety hazards. In addition, the reduction reaction of the method is carried out at high temperature, which consumes energy and increases the production cost; therefore, under the consideration of energy saving, cost, safety and regulations, the method is not conducive to mass production.

China Patent Publication 106669662 discloses a method for making colloidal platinum nanoparticles, which adopts platinum hydroxide as a raw material, hydrogen gas as a reducing agent, a combination of ascorbic acid and acetylacetone as a stabilizer, PVP as a dispersant, and cellulose ether as a thickener. The method makes platinum nanocatalyst supported by titanium dioxide in a n-butyl titanate sol. The procedure of the method is cumbersome, and it still uses the explosive hydrogen gas as the reducing agent, so it still has safety hazards.

Japan Patent Publication 2018-35427 discloses a method for making colloidal platinum nanoparticles, which uses a fruit acid such as malic acid, citric acid or ascorbic acid to reduce chloroplatinic acid. The method strictly limits the temperature range of the four steps, and chloroplatinic acid is directly converted to colloidal platinum nanoparticles in the presence of hydrogen peroxide, sugar alcohol, PVP, and a large amount of water.

The above-mentioned conventional methods for making colloidal platinum nanoparticles (shown in FIG. 2) need to undergo a sequence of cumbersome steps to produce chloroplatinic acid or chloroplatinate salts as the starting material, such as oxidation and dissolving of platinum metal, condensation, crystallization and refinement of the crude products.

Moreover, because the step of reducing chloroplatinic acid or chloroplatinate to platinum nanoparticles should complete the collidalization of platinum nanoparticles at the same time, the conventional methods need to search for the optimized combination of the reducing agent, the dispersing agent, and the stabilizing agent. Therefore, it not only restricts flexibility of choices of the reagents but also increases the complexity of the preparation process.

As a result, said methods in the prior art still are not performed conveniently and efficiently.

SUMMARY OF THE INVENTION

In view that the conventional methods fail to produce colloidal platinum nanoparticles directly from platinum metal, restrict the flexibility of combination of reagents, and affect product diversity, an objective of the instant disclosure is to provide a method and a system of making colloidal platinum nanoparticles, the method using a platinum metal as a raw material, thereby obtaining the high yield product in a simple, safe, time-effective, cost-effective, and environment-friendly way.

To achieve the foresaid objectives, the instant disclosure provides a method of making colloidal platinum nanoparticles, which comprises three consecutive steps. The method includes steps (a) to (c). In step (a), platinum powders and a hydrochloric acid aqueous solution containing a halogen-containing oxidizing agent are mixed and heated in a reaction vessel; therefore, the platinum powders are dissolved, so an inorganic platinum solution is obtained, wherein the inorganic platinum solution contains an inorganic platinum compound comprising chloroplatinic acid, sodium chloroplatinate, potassium chloroplatinate, or ammonium chloroplatinate. In step (b), a reducing agent is added into the inorganic platinum solution in the reaction vessel to form a mixture solution; the mixture solution is heated to undergo a reduction reaction and produce a composition containing platinum nanoparticles, residues and a gas, and guiding the gas out of the reaction vessel, wherein the amount of the residues is less than 15% by volume of the mixture solution. In step (c), a medium is added into the reaction vessel to disperse the platinum nanoparticles, so as to obtain the colloidal platinum nanoparticles. The consecutive steps (a) to (c) are performed in the same reaction vessel to make the colloidal platinum nanoparticles.

The instant disclosure is to provide a method of making colloidal platinum nanoparticles which directly uses a platinum metal as a raw material and undergoes a procedure of three consecutive individual steps in a same reaction vessel, sequentially dissolving the platinum metal, producing the platinum nanoparticles, and processing a collidalization, as shown in FIG. 1. The method not only has the advantages of low loss and high recovery of a one-pot reaction but also separates the processes of nanonization and collidalization, thereby reducing the difficulty in finding the optimal combination of reagents. It can simplify the process and increase the flexibility of choices of reagents and ensure product diversity.

By means of heating the mixture solution and guiding the gas, such as hydrogen chloride gas or ammonia gas, produced from the reduction reaction out of the reaction vessel which facilitates the processing of the forward reaction, the reduction reaction can be performed completely, and then the yield can be improved. Also, heating during the reduction reaction can vaporize parts of the solvent and reduce the volume of the mixture solution to increase the concentration of the reactants, enhance collision probability of reactant molecules in the reaction vessel, and thereby accelerates the reaction rate and facilitates to make nanoparticles with uniform size. Furthermore, guiding the gas out can remove anions in the solution and enhance the stability of the colloidal platinum nanoparticles. As water of the aqueous solution is vaporized during formation of platinum nanoparticles, the reduction reaction step and the dispersion step will not proceed at the same time. Accordingly, the reducing agents and dispersing agents have a wide range of choices and will not be restricted. In addition, the instant disclosure can improve the yield and simplify the production procedure of colloidal platinum nanoparticles since it is carried out in the same reaction vessel.

In accordance with the instant disclosure, the halogen-containing oxidizing agent used to dissolve the platinum powders in step (a) is selected from the group consisting of: a halogen oxoacid (referred to as $HXO_n$), a halogen oxoacid salt (referred to as $MXO_n$), a halogen oxide (referred to as $X_pO_q$), and any combination thereof. Said halogen (X) of various halogen-containing oxidizing agents is Cl, Br, or I, M is Na, K, or $NH_4$, wherein n is an integer 1, 2, 3 or 4, p is an integer 1 or 2; and q is an integer 1, 2, 3, or 5.

In certain embodiments, the halogen-containing oxidizing agent is the halogen oxyacid ($HXO_n$); preferably, the halogen oxyacid may be hypochlorous acid (HClO), chlorous acid ($HClO_2$), chloric acid ($HCO_3$), perchloric acid ($HClO_4$), hypobromous acid (HBrO), bromous acid ($HBrO_2$), bromic acid ($HBrO_3$), hypoiodous acid (HIO), iodic acid ($HIO_3$), periodic acid ($HIO_4$), or any combination thereof.

In certain embodiments, the halogen-containing oxidizing agent is the halogen oxyacid salt ($MXO_n$); preferably, the halogen oxyacid salt may be sodium hypochlorite (NaClO), potassium hypochlorite (KClO), sodium chlorite ($NaClO_2$), potassium chlorite ($KClO_2$), sodium chlorate ($NaClO_3$), potassium chlorate ($KClO_3$), sodium perchlorate ($NaClO_4$), potassium perchlorate ($KClO_4$), ammonium perchlorate [($NH_4$)$ClO_4$], sodium hypobromite (NaBrO), potassium hypobromite (KBrO), sodium bromite ($NaBrO_2$), potassium bromite ($KBrO_2$), sodium bromate ($NaBrO_3$), potassium bromate ($KBrO_3$), sodium hypoiodite (NaIO), potassium hypoiodite (KIO), sodium iodate ($NaIO_3$), potassium iodate ($KIO_3$), ammonium iodate [($NH_4$)$IO_3$], sodium periodate ($NaIO_4$), potassium periodate ($KIO_4$), or any combination thereof.

In certain embodiments, the halogen-containing oxidizing agent is the halogen oxide ($X_pO_q$); preferably, the halogen oxide may be dichlorine monoxide ($Cl_2O$), dichlorine trioxide ($Cl_2O_3$), chlorine dioxide ($ClO_2$), dibromine monoxide ($Br_2O$), dibromine trioxide ($Br_2O_3$), bromine dioxide ($BrO_2$), dibromine pentoxide ($Br_2O_5$), diiodine monoxide ($I_2O$), diiodine pentoxide ($I_2O_5$), or any combination thereof.

In certain embodiments, the halogen oxide is prepared from the specific chemical reactions. For example, $ClO_2$ is prepared from sodium chlorite or potassium chlorite in hydrochloric acid.

In accordance with the instant disclosure, the gas produced from the reduction reaction in step (b) is trapped by water, which can reduce and reuse the acid wastes. Accordingly, the process is environment-friendly.

In certain embodiments, the chloroplatinic acid or the chloroplatinate salts is used for making platinum nanoparticles, and the gaseous HCl generated from the reduction reaction is trapped with water to make hydrochloric acid for recovery.

In certain embodiments, the reaction temperature affects the reaction rate of making platinum nanoparticles. Without proper temperature control, the reaction will proceed non-uniformally and may generate bubbles that affect the quality of platinum nanoparticles.

In accordance with the instant disclosure, a heating temperature in step (a) ranges from 40° C. to 100° C.

In accordance with the instant disclosure, a heating temperature in step (b) ranges from 50° C. to 150° C. Preferably, the heating temperature in step (b) ranges from 70° C. to 130° C.

In accordance with the instant disclosure, the reducing agent may comprise at least one ester.

In certain embodiments, said ester is selected from the group consisting of a carboxylate ester, a cyclic ester, a polymeric ester, and any combination thereof.

Specifically, said carboxylate ester is represented by the formula (I),

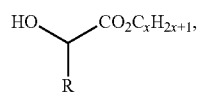

wherein R is H or $CH_3$, and x is an integer ranging from 1 to 16.

Specifically, said cyclic ester is represented by the formula (II),

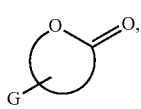

wherein the ring contains one oxygen atom and 4 to 6 carbon atoms, and G is H, $CH_3$ or $C_2H_5$.

Specifically, said polymeric ester is represented by the formula (III),

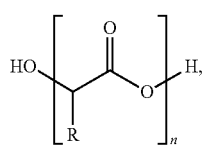

wherein R is H or $CH_3$, and n is an integer ranging from 2 to 1400.

Preferably, said combination of the esters may be a combination of methyl lactate and ethyl lactate, a combination of methyl lactate and γ-butyrolactone, or a combination of ethyl lactate and γ-butyrolactone.

In accordance with the instant disclosure, the reducing agent may further comprise citric acid, lactic acid, glycolic acid, ascorbic acid, oxalic acid, tartaric acid, 1,4-butanediol, glycerol, poly(ethylene glycol), hydroquinone, acetaldehyde, glucose, cellulose, carboxymethyl cellulose, cyclodextrin, chitin, chitosan, or any combination thereof.

In certain embodiments, the reducing agent may comprise a combination of at least one ester and at least one non-ester reducing agent.

Preferably, said combination of at least one ester and at least one non-ester reducing agent may be methyl lactate in combination with lactic acid, citric acid, 1,4-butanediol, or poly(ethylene glycol).

Preferably, said combination of at least one ester and at least one non-ester reducing agent may be ethyl lactate in combination with lactic acid, citric acid, 1,4-butanediol, or poly(ethylene glycol).

Preferably, said combination of at least one ester and at least one non-ester reducing agent may be γ-butyrolactone in combination with lactic acid.

In certain embodiments, the molar concentration of the solution containing the inorganic platinum compound of step (b) ranges from 0.01 M to 3.0 M. Preferably, the molar concentration of the solution ranges from 0.01 M to 1.0 M. More preferably, the molar concentration of the solution is 0.1 M.

In some cases, when the reducing agent is selected from the group consisting of carboxylate ester, cyclic ester, citric acid, lactic acid, glycolic acid, ascorbic acid, oxalic acid, tartaric acid, 1,4-butanediol, glycerol, hydroquinone, acetaldehyde, glucose, chitin, and any combination thereof, a molar ratio of the reducing agent relative to the inorganic platinum compound ranges from 1 to 40. Preferably, the molar ratio of the reducing agent relative to the inorganic platinum compound ranges from 1 to 8. More preferably, the molar ratio of the reducing agent relative to the inorganic platinum compound is 4.

In some cases, the ester may be polymeric ester, and the weight of said polymeric ester ranges from 30 mg to 150 mg.

In accordance with the instant disclosure, the reaction time ranges from 5 minutes to 80 minutes depending on the kind of the reducing agent and the molar concentration of reactants. Preferably, the reaction time ranges from 7 minutes to 30 minutes.

The reduction rate of platinum ion of the solution containing the inorganic platinum compound can be tuned by a combined use of the reducing agents to give platinum nanoparticles in various sizes.

In accordance with the instant disclosure, the medium in step (c) for dispersing the platinum nanoparticles may be water or an aqueous solution including a dispersing agent.

In certain embodiments, said dispersing agent included in the aqueous solution may comprise citric acid, lactic acid, poly(lactic acid), sodium hydroxide, hexadecylamine, oleylamine, tetraoctylammonium bromide (TOAB), dodecanethiol, poly(ethylene glycol), polyvinylpyrrolidone (PVP), or any combination thereof.

The molar concentration of the dispersing agent ranges from 0.001 M to 0.1 M. Preferably, the molar concentration of the dispersing agent ranges from 0.01 M to 0.05 M.

In some cases, a molar ratio of the dispersing agent to the platinum nanoparticles ranges from 1 to 100. Preferably, the molar ratio of the dispersing agent to platinum nanoparticles ranges from 3 to 30.

In accordance with the instant disclosure, a dispersion temperature in step (c) ranges from 20° C. to 100° C. Preferably, the dispersion temperature in step (c) ranges from 50° C. to 80° C.

In accordance with the instant disclosure, all the water used in the aqueous solution is distilled water. More preferably, the water is deionized water.

It is beneficial to use organic reducing agents in step (b) and use water only or water with organic dispersing agents in step (c). Accordingly, said colloidal platinum nanoparticles attain a good stability.

While the reduction reaction of step (b) is carried out, guiding the HCl gases produced from the reduction reaction out of the reaction vessel is beneficial. Accordingly, said colloidal platinum nanoparticles will attain a good stability without the interference of anions.

In accordance with the instant disclosure, the process of the reduction reaction is monitored by the infrared (IR) spectral analysis on-site. The region from about 1500 cm$^{-1}$ to 500 cm$^{-1}$ of the IR spectrum, known as the fingerprint region, contains a very complicated series of absorptions. These are mainly due to all manners of bond vibrations within the molecule. The importance of the fingerprint region is that each different substance produces a different pattern of troughs in this part of the spectrum. Therefore, the pattern of troughs different from the original mixture solution means the reaction proceeds, and when the pattern of troughs is not changed apparently, the reaction is completed.

In accordance with the instant disclosure, the change of the wavelength at absorption maximum ($\lambda_{max}$) in the ultraviolet-visible (UV-Vis) spectral absorption also can be used to determine whether the reaction of producing platinum nanoparticles by $H_2PtCl_6$ is completed or not. When said $H_2PtCl_6$ reacts completely, the $\lambda_{max}$ of 260 nm will disappear and the $\lambda_{max}$ will be shifted to a shorter wavelength.

In accordance with the instant disclosure, the kinds of the dispersing agents and the size of the colloidal platinum nanoparticles will affect the $\lambda_{max}$ in UV-Vis spectrum. For example, when the colloidal platinum nanoparticles have an average size of 7 nm to 9 nm, they have the $\lambda_{max}$ between 220 nm and 260 nm correspondingly; when the colloidal platinum nanoparticles have an average size of 2 nm to 4 nm, they have strong absorption at UV short wavelength correspondingly but no obvious peak such as the spectra illustrated in FIGS. 6 and 8 of the instant disclosure.

In accordance with the instant disclosure, the size of the colloidal platinum nanoparticles also can be characterized by transmission electron microscopy (TEM) imaging. The size of the core of the platinum metal ranges from 2 nm to 4 nm.

In accordance with the instant disclosure, the size distribution profile of the colloidal platinum nanoparticles can be analyzed by a dynamic light scattering detector (DLS).

In accordance with the instant disclosure, the colloidal platinum nanoparticles show high zeta potential, which is a key indicator of the stability of colloidal dispersion.

In this specification, "residue" of step (b) means the remaining solution containing unevaporated water and a few unreacted materials in the same reaction vessel, such as the platinum powders, the inorganic platinum compound and the reducing agent.

In this specification, where a range of values is provided, it is understood that each intervening value, to the tenth of the unit of the lower limit unless the context clearly dictates otherwise, between the upper and lower limits of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Other objectives, advantages and novel features of the disclosure will become more apparent from the following detailed description when taken in conjunction with the accompanying drawings.

BRIEF DESCRIPTION OF THE DRAWINGS

FIGS. 11A-1 to 11A-3 are TEM images of the colloidal platinum nanoparticles obtained in Example 1 of the instant disclosure;

FIGS. 11B-1 to 11B-3 are TEM images of the colloidal platinum nanoparticles obtained in Example 5 of the instant disclosure;

DETAILED DESCRIPTION OF THE PREFERRED EMBODIMENTS

Figure 1:
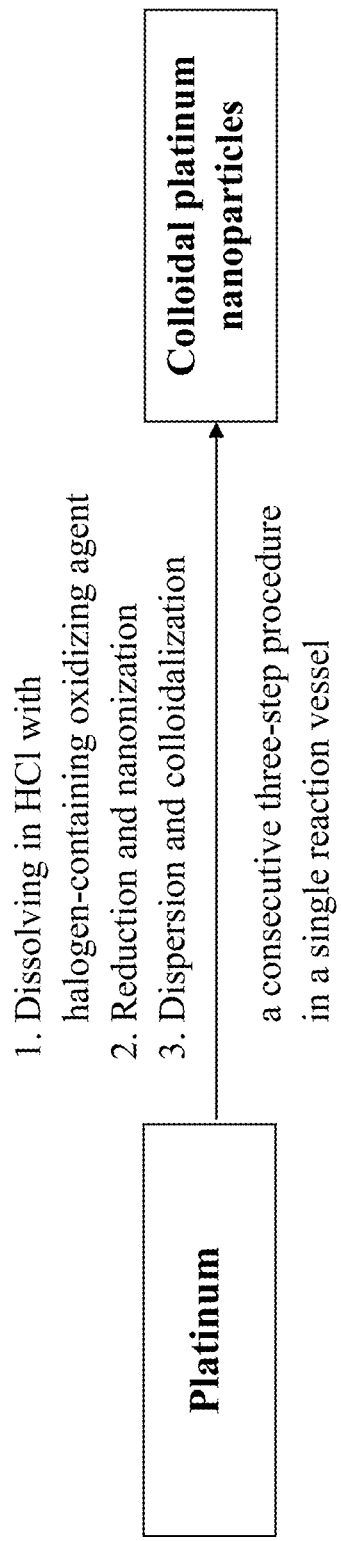
FIG. 1 is a schematic flow diagram illustrating a method for making colloidal platinum nanoparticles in accordance with the instant disclosure.
Figure 2:
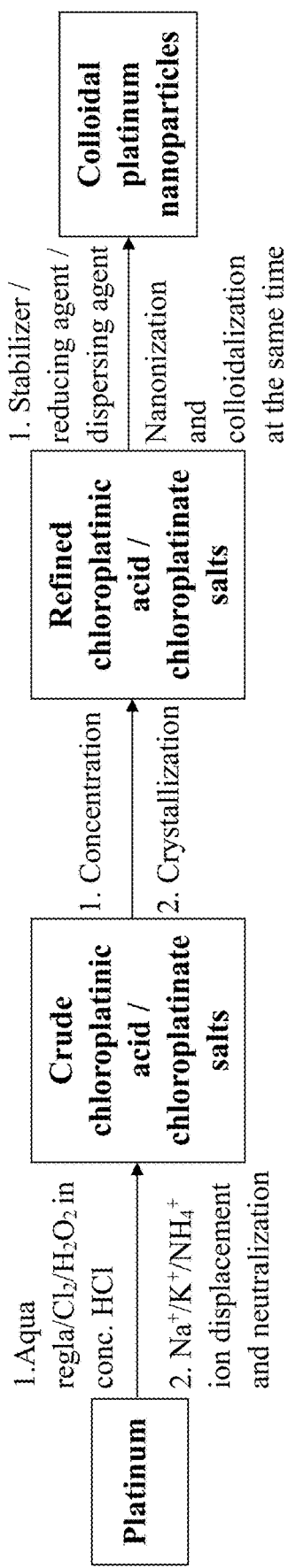
FIG. 2 is a schematic flow diagram illustrating a method of making colloidal platinum nanoparticles in accordance with the prior art.

Hereinafter, one skilled in the arts can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Process of Making Colloidal Platinum Nanoparticles

In the following examples, infrared (IR) spectra were recorded on Agilent Technologies Cary630 Fourier transform (FT)-IR spectrometer. Inductively coupled plasma-optical emission spectra (ICP-OES) were measured on Perkin Elmer optima 8X00 spectrometer. Ultraviolet-visible (UV-Vis) spectra were measured on Agilent Technologies Cary60 UV-Vis spectrophotometer. Transmission electron microscopy (TEM) images were recorded on Hitachi H-7100 microscope. Size and zeta potential analyses were measured on Otsuka ELSZ-2000ZS DLS. All the reagents were reagent grade and used as purchased without further purification. All the reagents were reagent grade and were used without further purification. Platinum powders were purchased from Acros Organics. Ultra-pure water was purchased from Hao Feng Biotech Co.

Comparative Example 1

Using Aqua Regia to Dissolve Platinum in HCl and Synthesis of Colloidal Platinum Nanoparticles by Using Citric Acid as the Reducing Agent First, in step (a'), platinum powders (19.5 mg, 0.10 mmol) and aqua regia (1 mL of aqueous solution containing 36 wt % hydrochloric acid and 68 wt % nitric acid) were placed in a 10 mL flat-bottomed flask to form a reaction mixture. The reaction mixture was stirred at 60° C. for 10 minutes until all the platinum powders were consumed to give a solution containing chloroplatinic acid. After completion of the reaction, concentrated hydrochloric acid was added into the solution containing chloroplatinic acid for several times and heated at 100° C. for evaporation until no brown gas of nitrogen oxides evolved. Therefore, an aqueous solution containing chloroplatinic acid hexahydrate $[H_2PtCl_6(H_2O)_6]$ was obtained.

Subsequently, in step (b), citric acid (200 mg, 1.04 mmol) was added into the flat-bottomed flask to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles, which were measured by ICP-OES to analyze the amounts of the heavy metal impurities, and the results were shown in Table 1.

TABLE 1 the analytical result of ICP-OES of Comparative Example 1

| | Heavy metal impurities | | | | | | | |
|---|---|---|---|---|---|---|---|---|
| | Al | Cr | Cu | Fe | Mg | Mn | Ni | Zn |
| Concentration (ppm) | 1.45 | 0.07 | 0.02 | 2.67 | 1.1 | 0.09 | 0.32 | 0.41 |

Hereinafter, the procedures of making colloidal platinum nanoparticles illustrated below were conducted by using the method as shown in FIG. 1.

Example 1

Synthesis of Colloidal Platinum Nanoparticles Using Citric Acid as the Reducing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (20 mg, 0.22 mmol) and $NaClO_3$ (60 mg, 0.57 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate ($Na_2PtCl_6$).

Subsequently, in step (b), citric acid (200 mg, 1.04 mmol) was added into the flat-bottomed flask and mixed with the solution containing $Na_2PtCl_6$ to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask, and was trapped with 40 mL water in an Erlenmeyer flask for collection.

Figure 3:
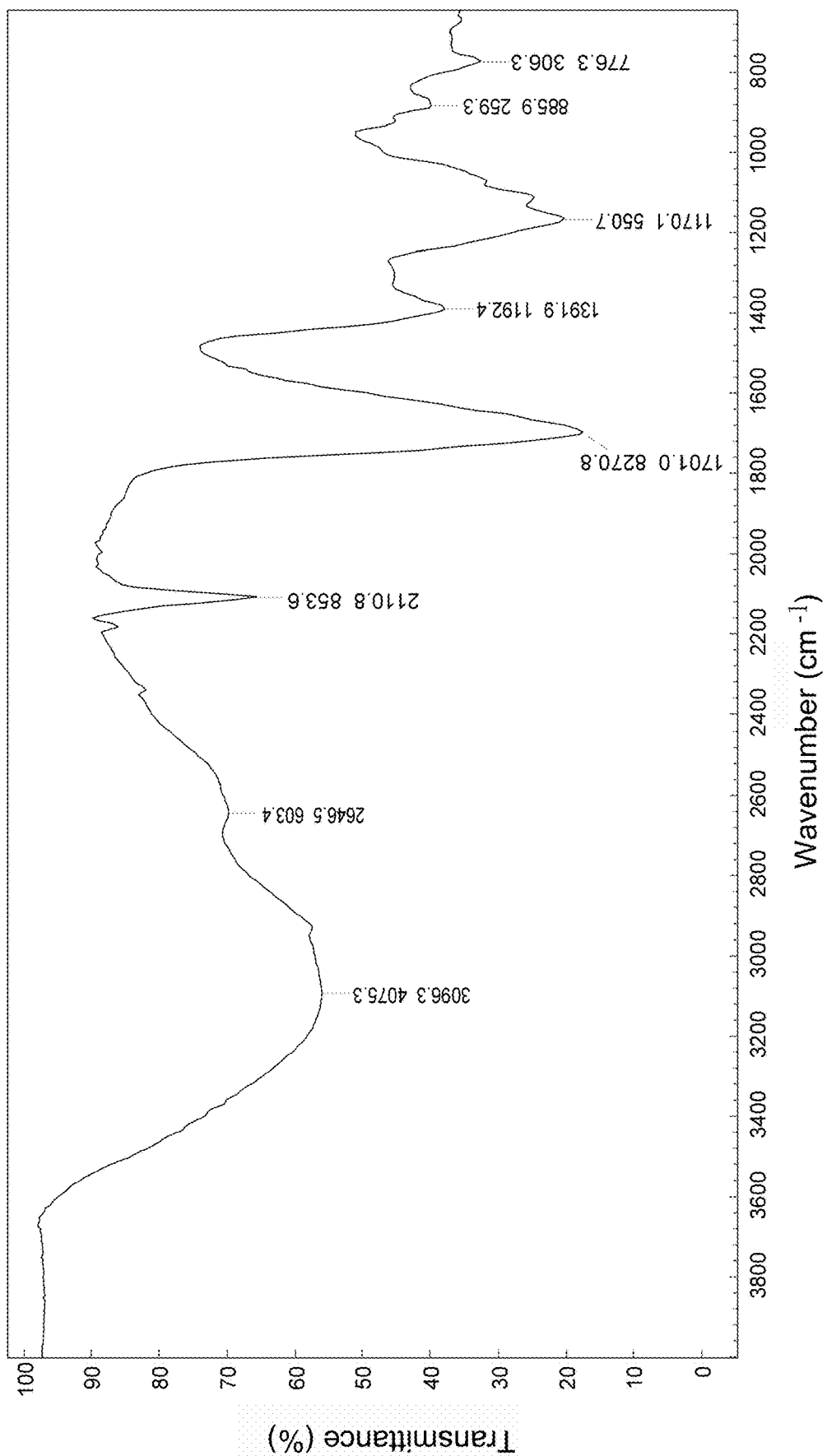
FIG. 3 is a FT-IR spectrum of the colloidal platinum nanoparticles obtained in Example 1 of the instant disclosure.
Figure 4:
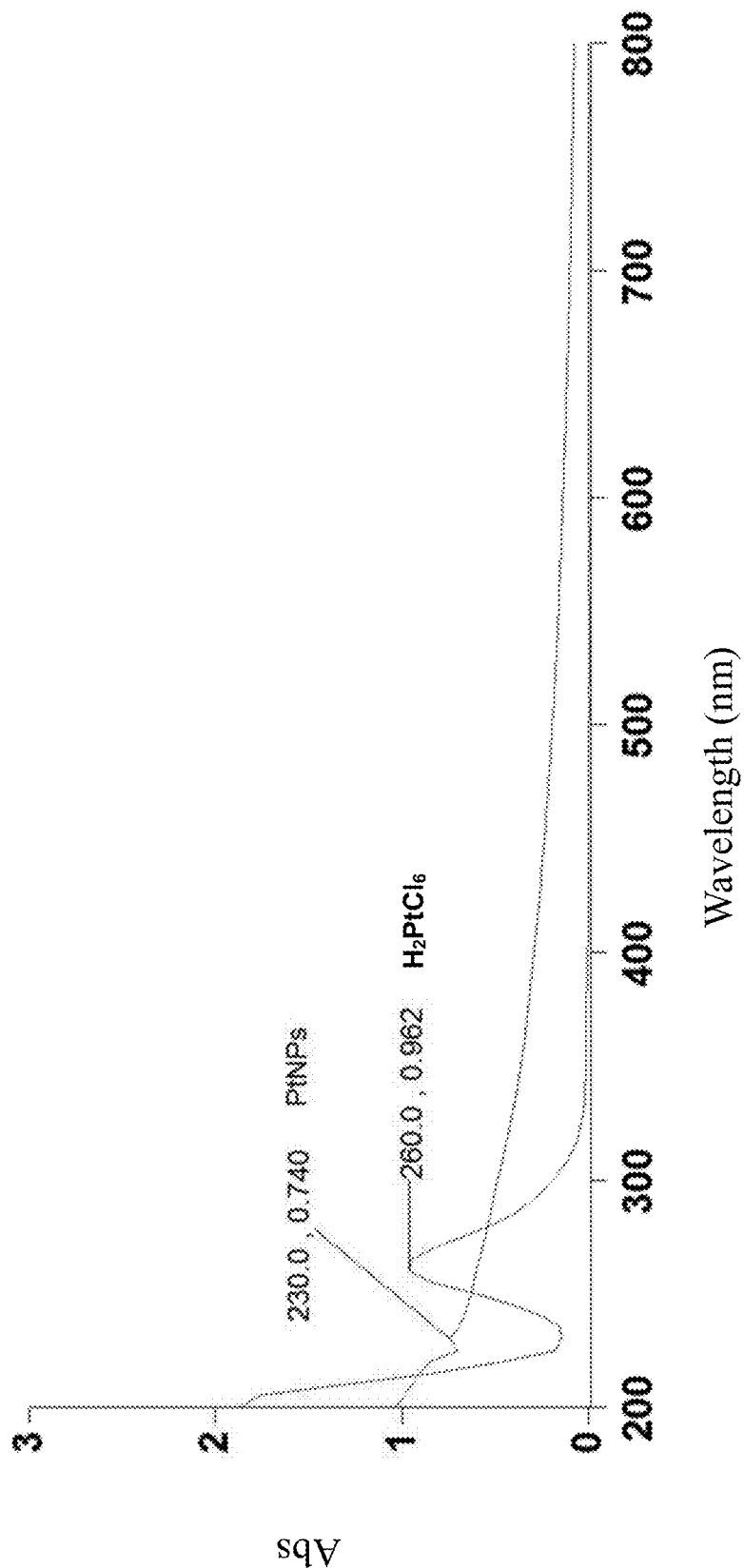
FIG. 4 is a UV-Vis spectrum of the colloidal platinum nanoparticles obtained in Example 1 of the instant disclosure.
Figures 1, 11A:
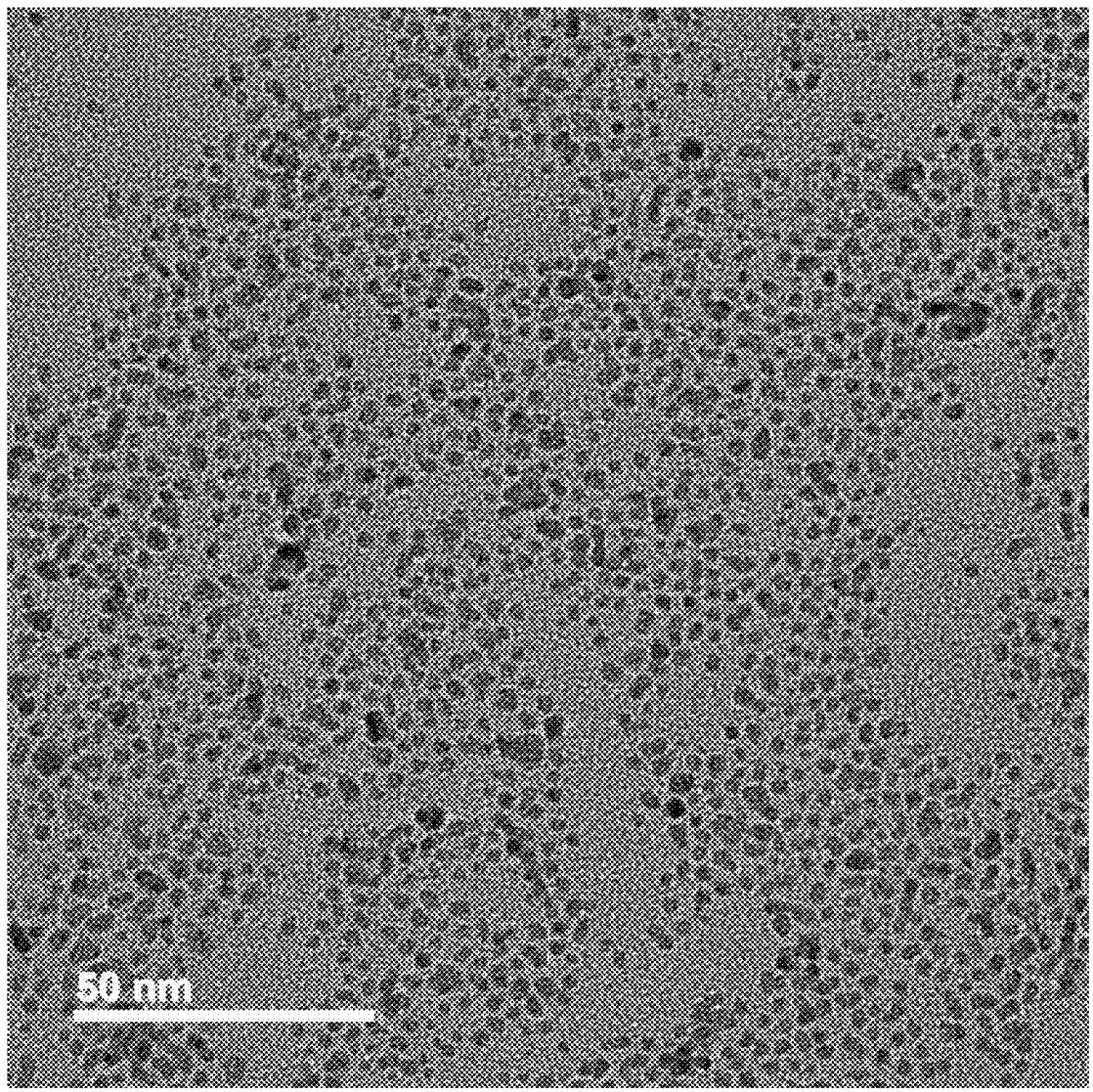
Figures 2, 11A:
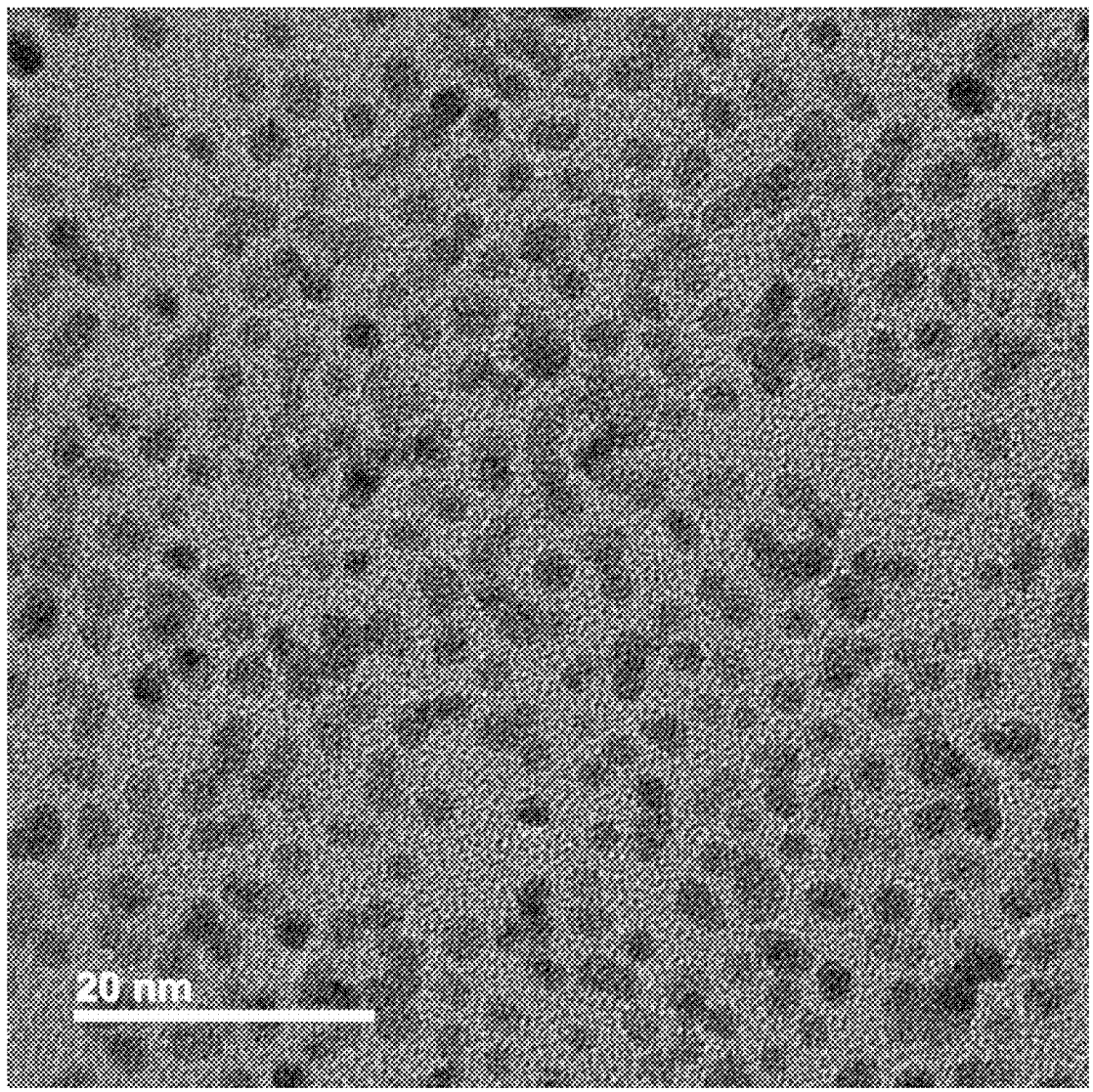
Figures 3, 11A:
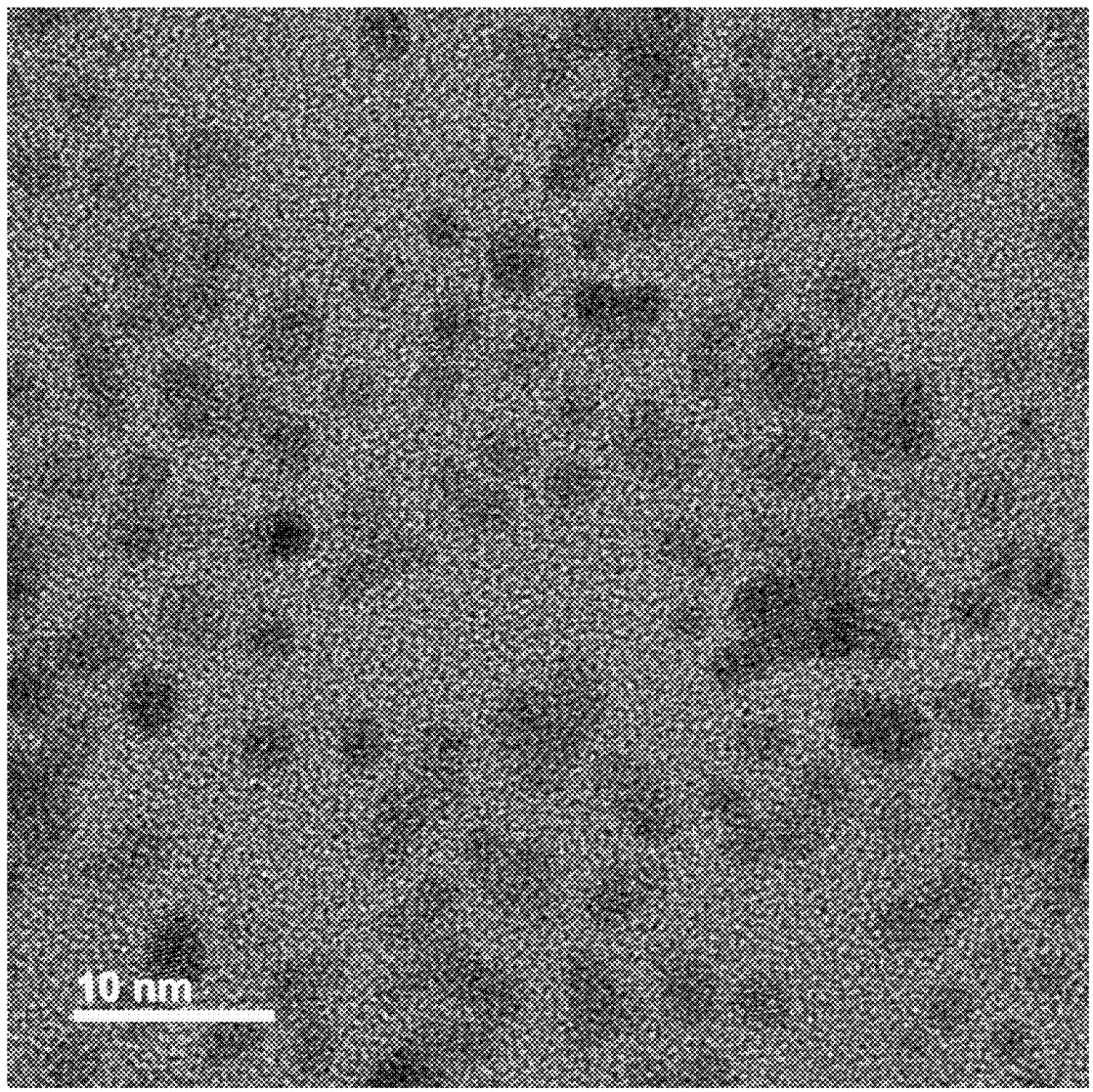

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 4. In addition, the resulting colloidal platinum nanoparticles were confirmed by the FT-IR spectrum as shown in FIG. 3. TEM images of the product of Example 1 were shown in FIGS. 11A-1 to 11A-3. Moreover, the product of Example 1 was measured by ICP-OES to analyze its amounts of heavy metal impurities, and the results were shown in Table 2.

TABLE 2 the analytical result of ICP-OES of Example 1

| | Heavy metal impurities | | | | | | | |
|---|---|---|---|---|---|---|---|---|
| | Al | Cr | Cu | Fg | Mg | Mn | Ni | Zn |
| Concentration (ppm) | 0.04 | 0.02 | 0.01 | 0.03 | 0.06 | ND | 0.01 | 0.03 |

Example 2

Synthesis of Colloidal Platinum Nanoparticles Using Citric Acid as the Reducing Agent and Glycerol as the Dispersing Agent First, in step (a), platinum powders (19.8 mg, 0.10 mmol) and 1 mL of concentrated hydrochloric acid aqueous solution containing 36 wt % of HCl were placed in a 10 mL flat-bottomed flask. Then, 1 mL of aqueous solution containing $HIO_3$ (60 mg, 0.31 mmol) and $HClO_4$ (50 μL of 70 wt % $HClO_{4(aq)}$, 0.58 mmol) was added into the flat-bottomed flask to obtain a reaction mixture. The reaction mixture was stirred and heated at 60° C. for 10 minutes until all platinum powders were consumed to obtain an inorganic platinum solution containing chloroplatinic acid ($H_2PtCl_6$).

Subsequently, in step (b), citric acid (160 mg, 0.8 mmol) was added into the flat-bottomed flask and mixed with the solution containing $H_2PtCl_6$ to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 5:
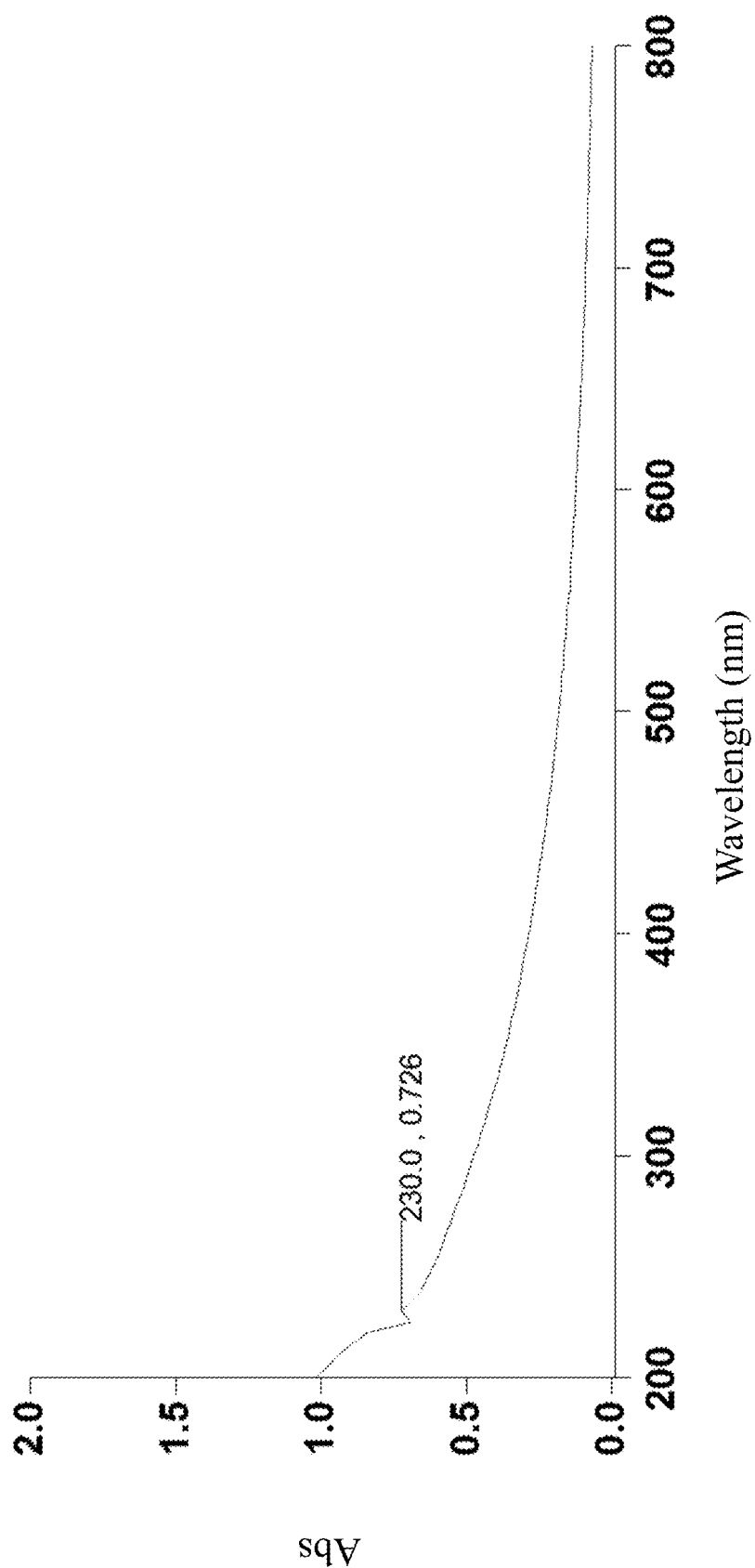
FIG. 5 is a UV-Vis spectrum of the colloidal platinum nanoparticles obtained in Example 2 of the instant disclosure.
Figure 12:
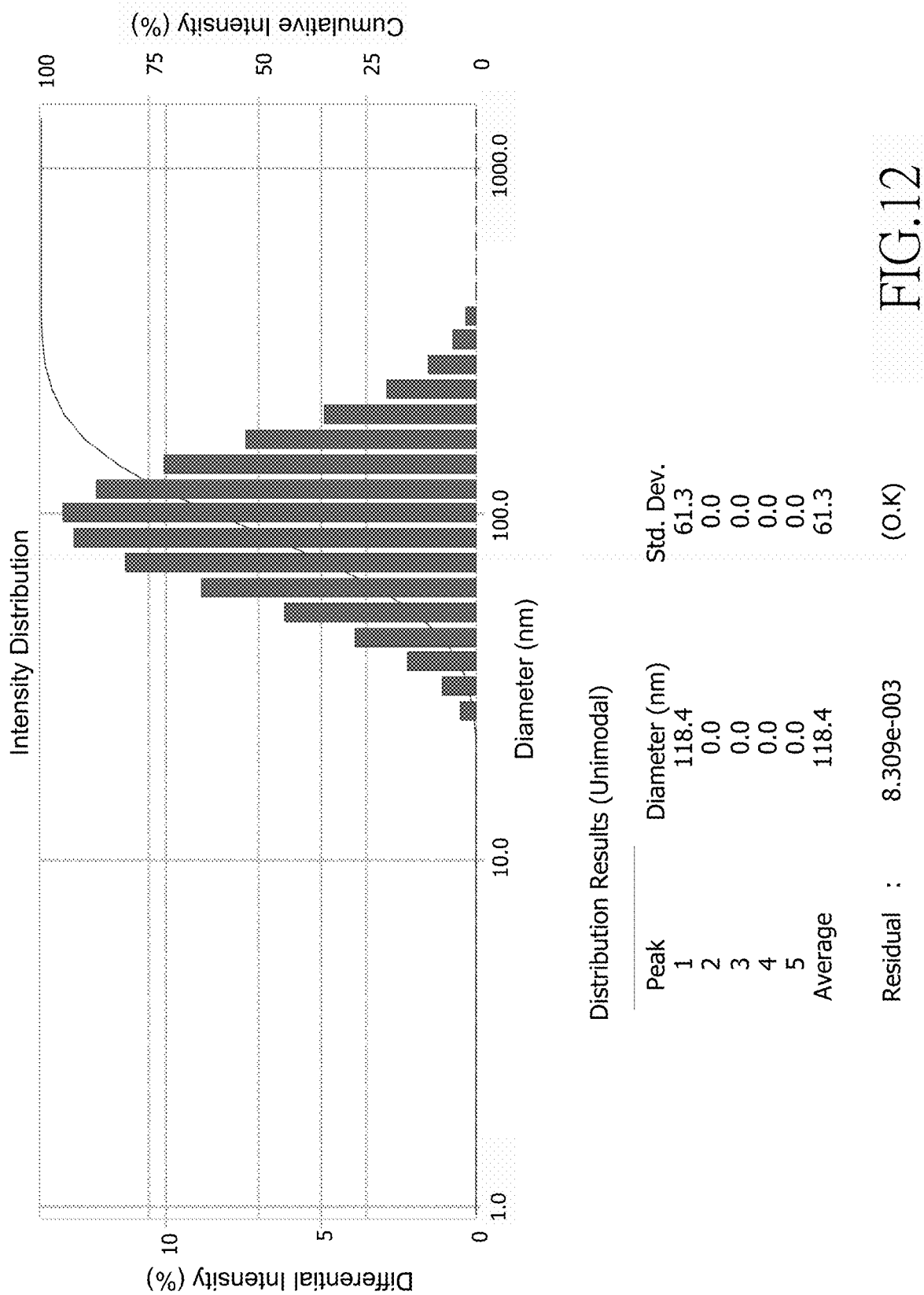
FIG. 12 is a DLS size distribution profile of the colloidal platinum nanoparticles obtained in Example 2 of the instant disclosure.

Finally, in step (c), 200 mL of an aqueous solution containing glycerol (800 mg, 8.7 mmol) as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 5. In addition, the size distribution profile of the colloidal platinum nanoparticles analyzed by the DLS was shown in FIG. 12.

Example 3

Synthesis of Colloidal Platinum Nanoparticles Using Citric Acid as the Reducing Agent and Lactic Acid as the Dispersing Agent First, in step (a), platinum powders (19.0 mg, 0.10 mmol) and 1 mL of concentrated hydrochloric acid aqueous solution containing 36 wt % of HCl were placed in a 10 mL flat-bottomed flask. Then, 1 mL of aqueous solution containing $KIO_3$ (70 mg, 0.33 mmol) and $KClO_4$ (30 mg, 0.22 mmol) was added into the flat-bottomed flask to obtain a reaction mixture. The reaction mixture was stirred and heated at 60° C. for 10 minutes until all platinum powders were consumed to obtain an inorganic platinum solution containing potassium chloroplatinate ($K_2PtCl_6$).

Subsequently, in step (b), citric acid (80 mg, 0.42 mmol) was added into the flat-bottomed flask and mixed with the solution containing $K_2PtCl_6$ to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 6:
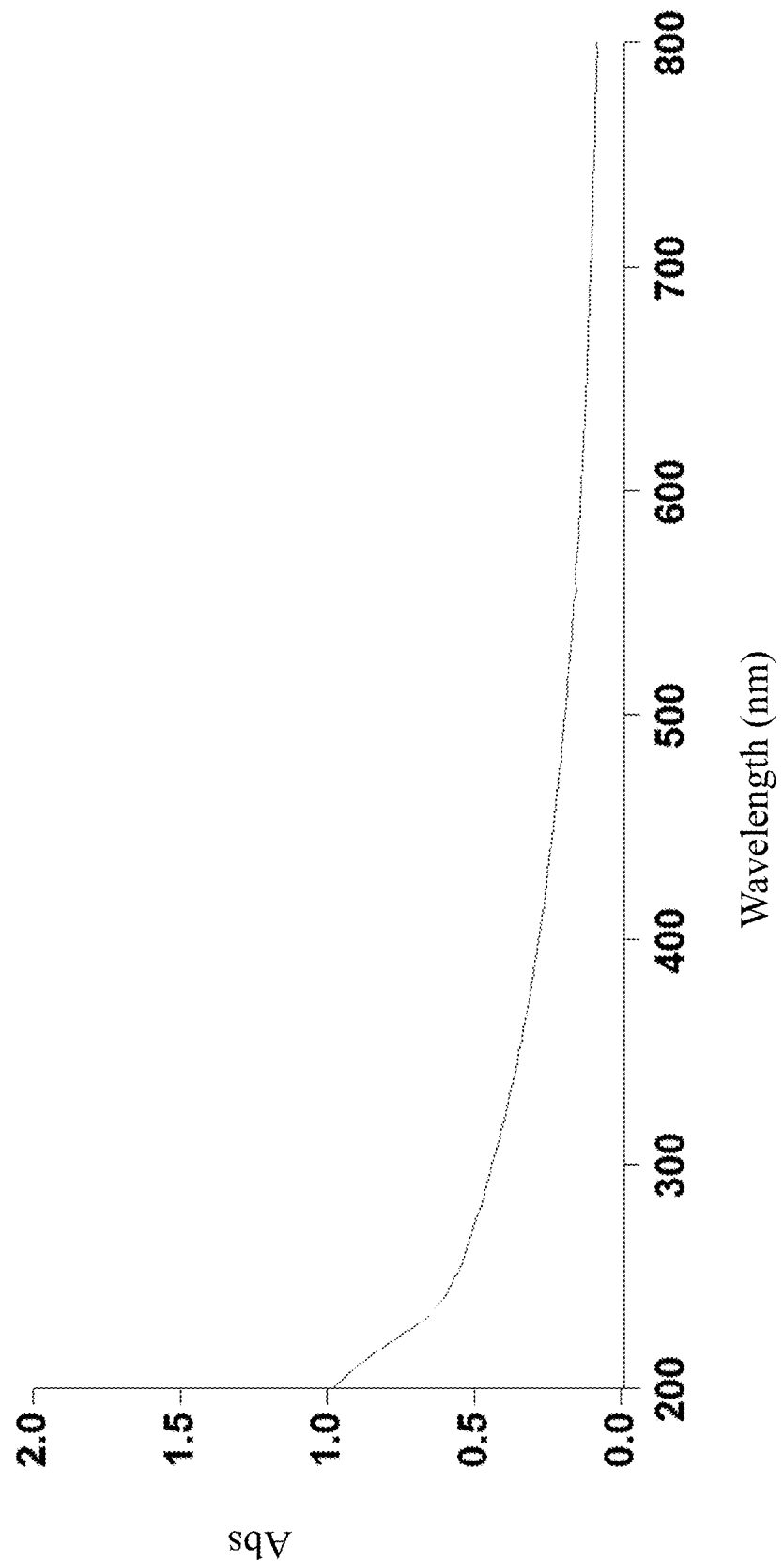
FIG. 6 is a UV-Vis spectrum of the colloidal platinum nanoparticles obtained in Example 3 of the instant disclosure.

Finally, in step (c), 200 mL of an aqueous solution containing lactic acid (800 mg, 8.9 mmol) as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 6.

Example 4

Synthesis of Colloidal Platinum Nanoparticles Using Citric Acid as the Reducing Agent and Poly(Ethylene Glycol) as the Dispersing Agent First, in step (a), platinum powders (19.7 mg, 0.10 mmol) and 1 mL of concentrated hydrochloric acid aqueous solution containing 36 wt % of HCl were placed in a 10 mL flat-bottomed flask. Then, 1 mL of aqueous solution containing $KClO_3$ (70 mg, 0.57 mmol) and $KClO_4$ (20 mg, 0.14 mmol) was added into the flat-bottomed flask to obtain a reaction mixture. The reaction mixture was stirred and heated at 60° C. for 10 minutes until all platinum powders were consumed to obtain an inorganic platinum solution containing potassium chloroplatinate.

Subsequently, in step (b), citric acid (100 mg, 0.52 mmol) was added into the flat-bottomed flask and mixed with the solution containing potassium chloroplatinate to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 7:
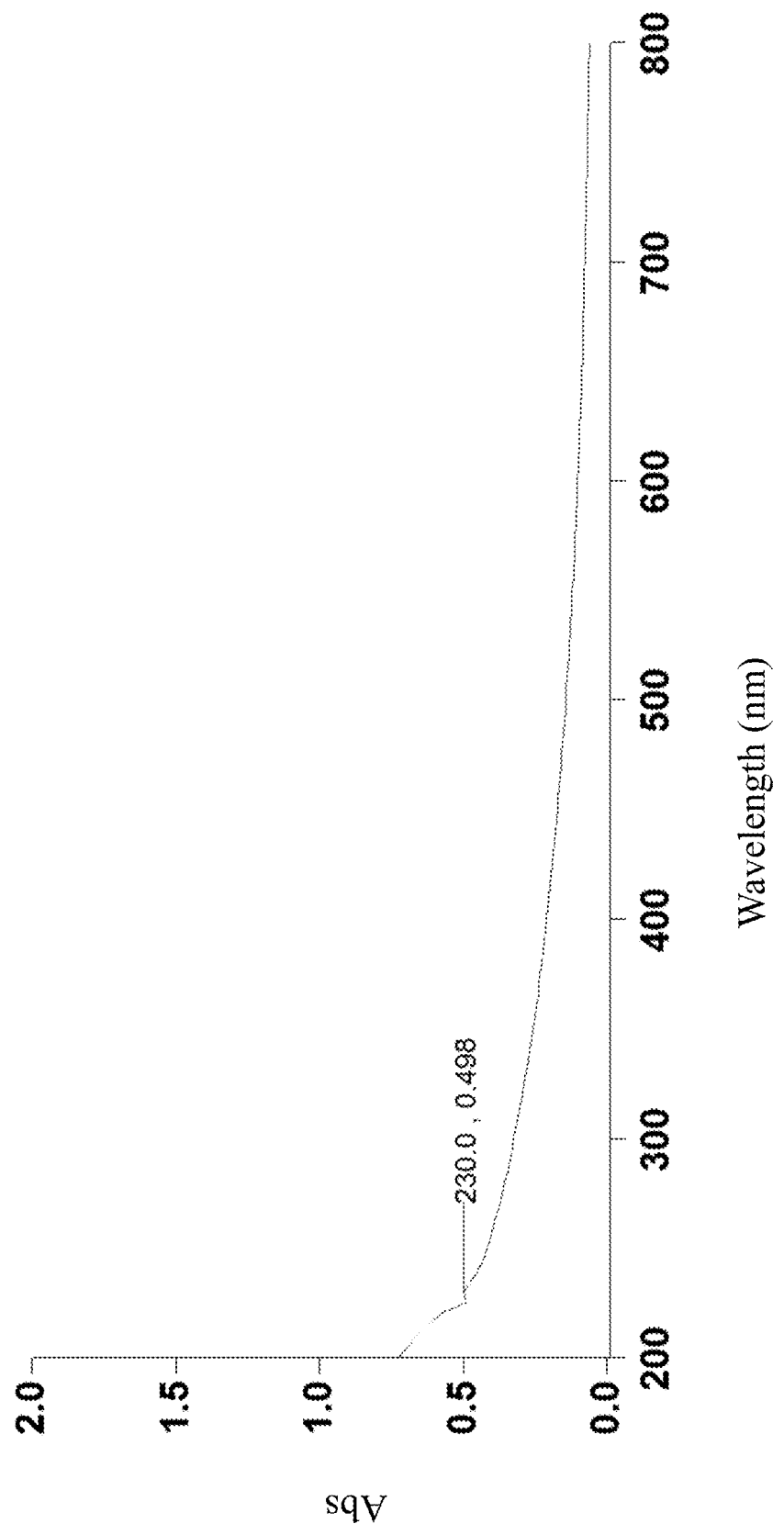
FIG. 7 is a UV-Vis spectrum of the colloidal platinum nanoparticles obtained in Example 4 of the instant disclosure.

Finally, in step (c), 200 mL of an aqueous solution containing poly(ethylene glycol) (800 mg, 1.0 mmol) as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 7.

Example 5

Synthesis of Colloidal Platinum Nanoparticles Using Methyl Lactate as Both the Reducing Agent and the Dispersing Agent First, in step (a), platinum powders (18.8 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (20 mg, 0.22 mmol) and $NaClO_3$ (60 mg, 0.57 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate.

Subsequently, in step (b), methyl lactate (64 mg, 0.62 mmol) was added into the flat-bottomed flask and mixed with the solution containing sodium chloroplatinate to form a mixture solution. Then, the flat-bottomed flask was placed on a hot plate and heated at 130° C. for 20 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 8:
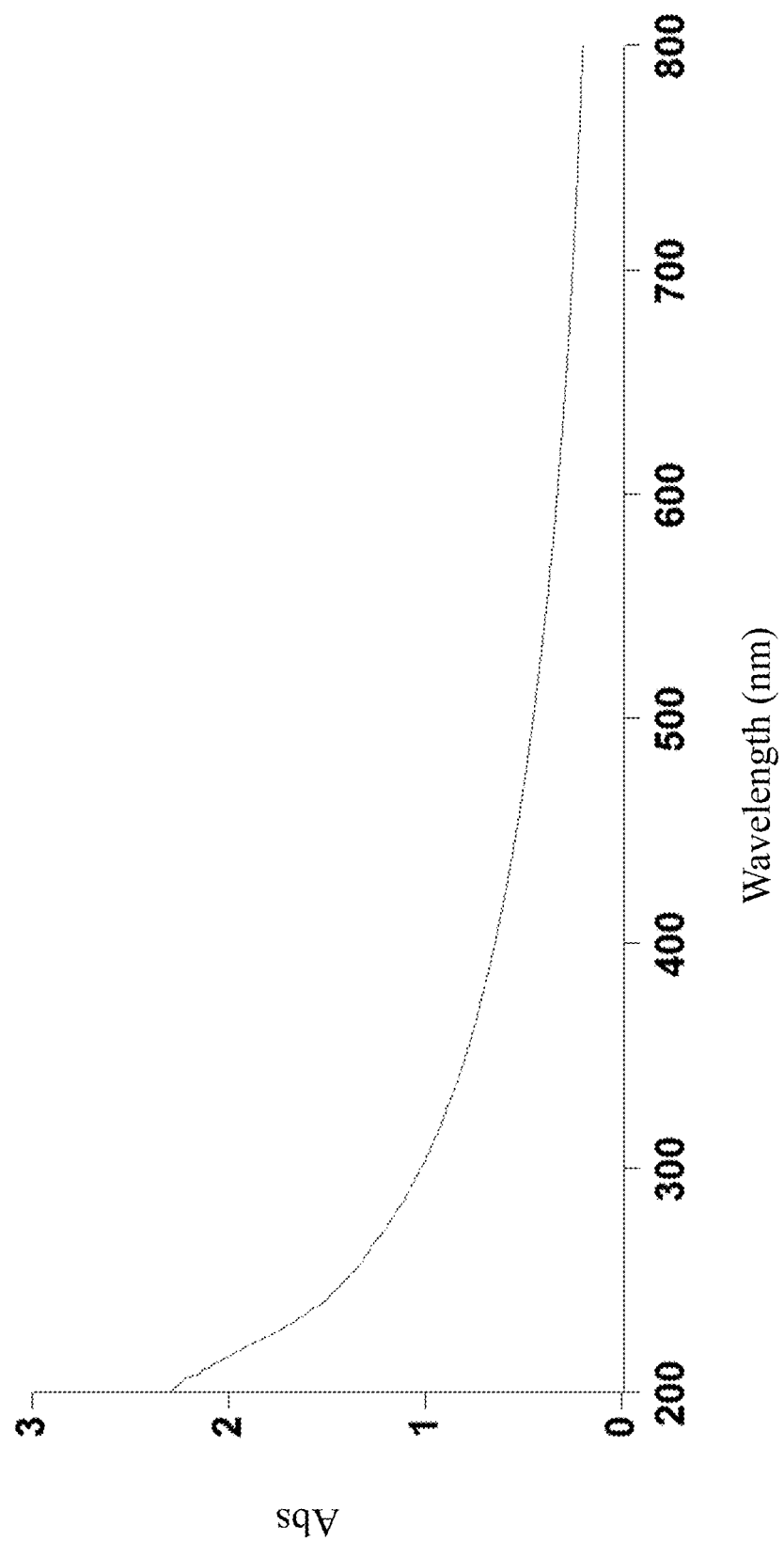
FIG. 8 is a UV-Vis spectrum of the colloidal platinum nanoparticles obtained in Example 5 of the instant disclosure.
Figure 9:
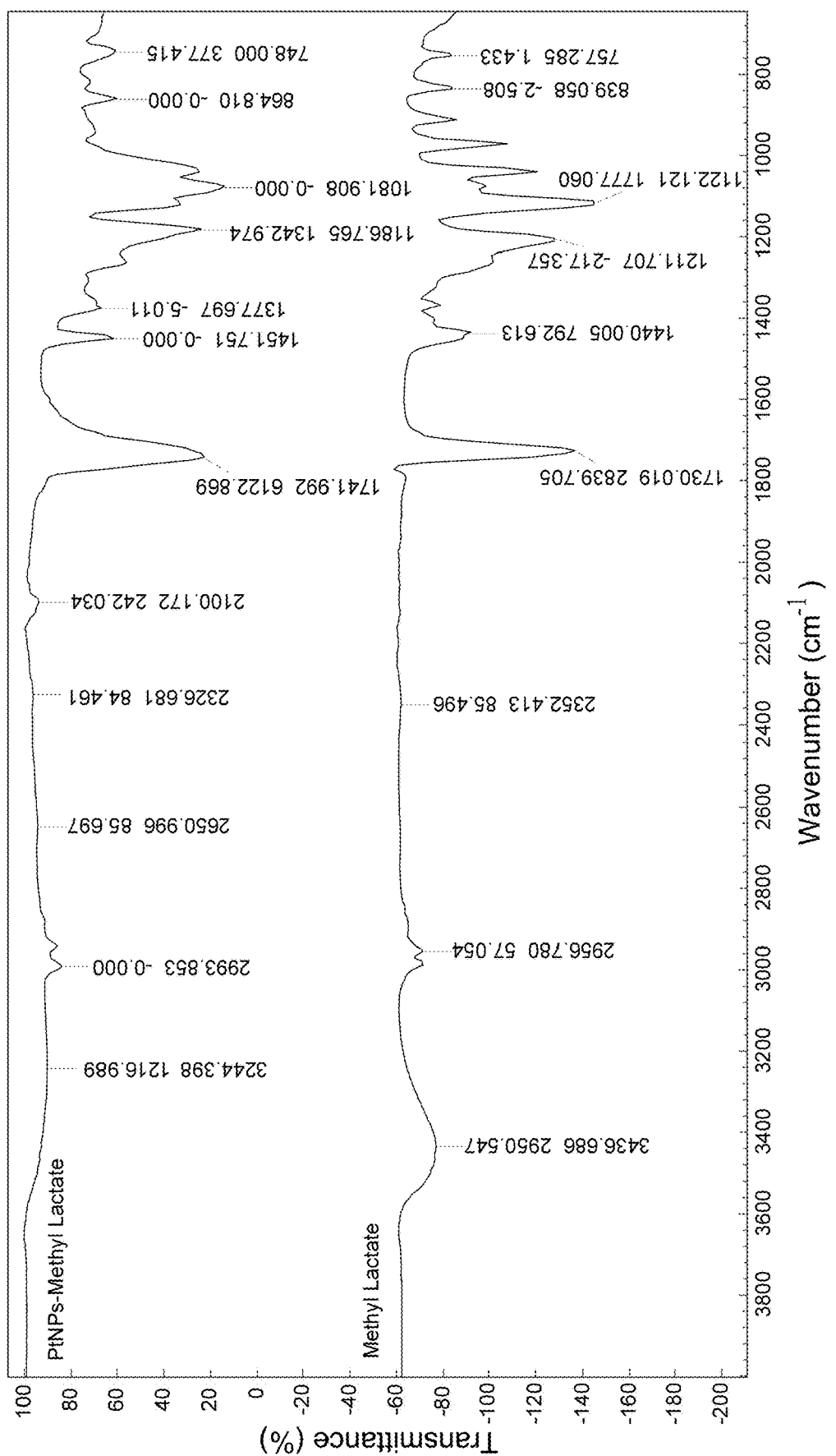
FIG. 9 is a FT-IR spectrum of the colloidal platinum nanoparticles obtained in Example 5 of the instant disclosure.
Figures 1, 11B:
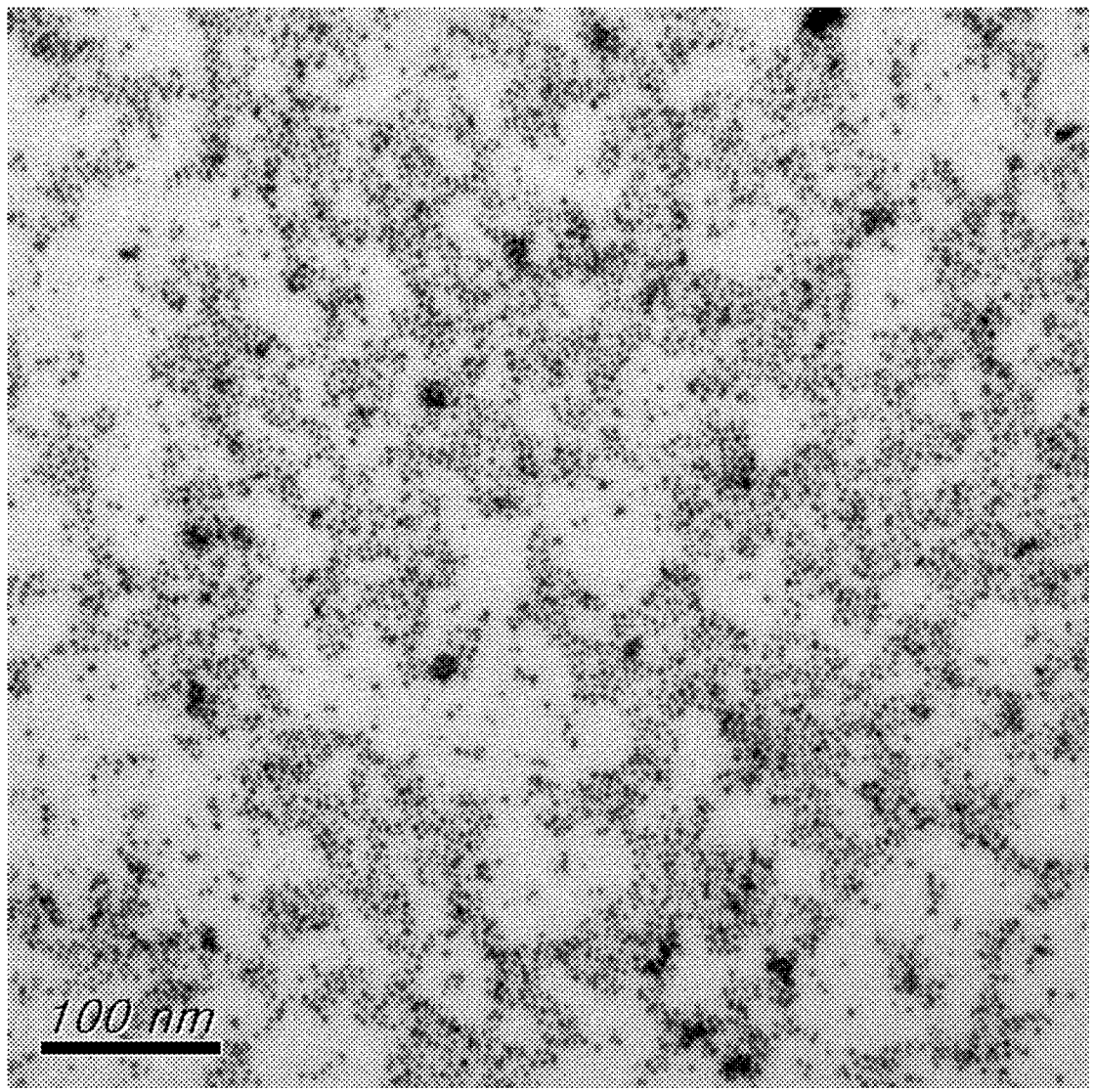
Figures 2, 11B:
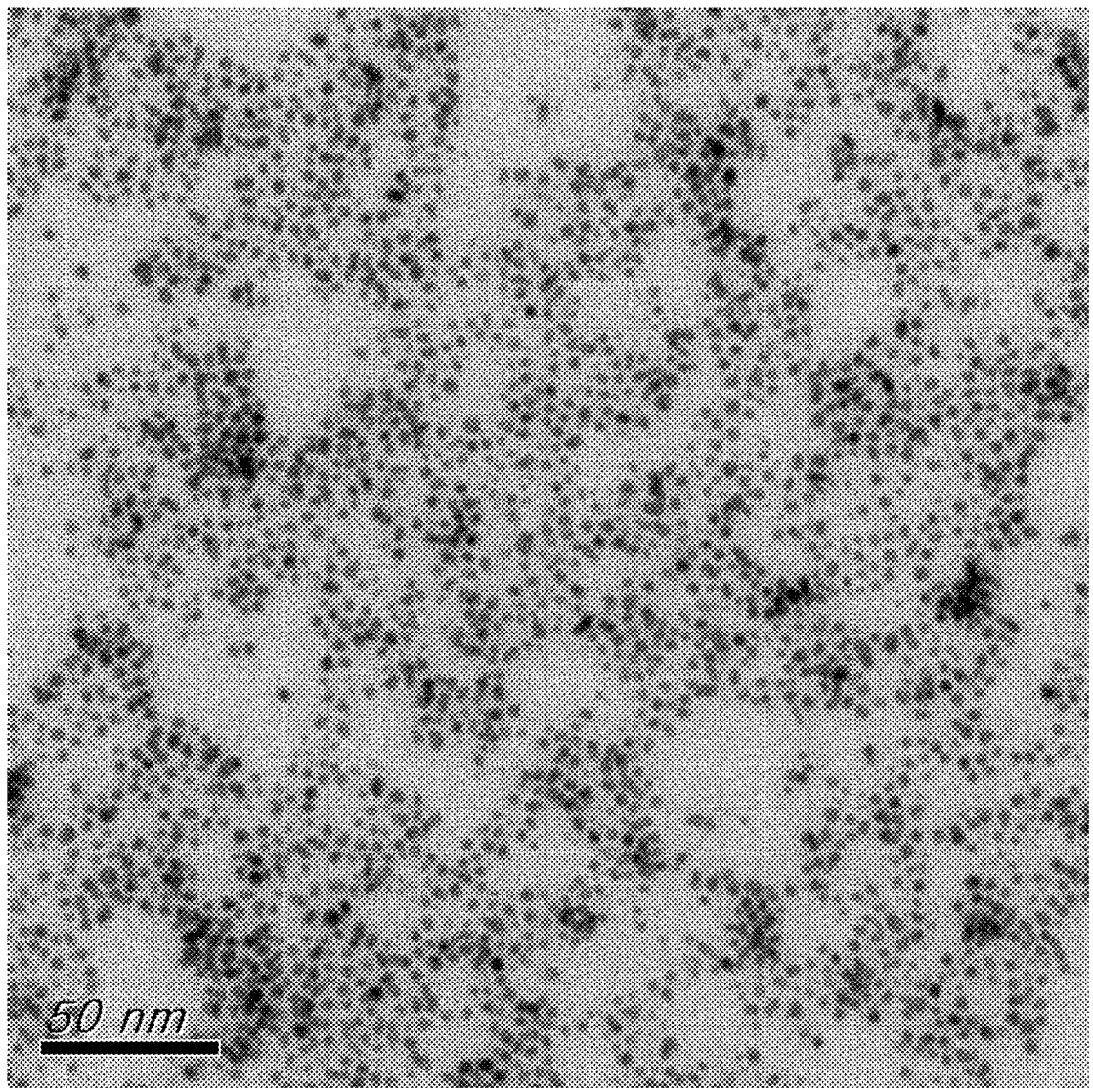
Figures 3, 11B:
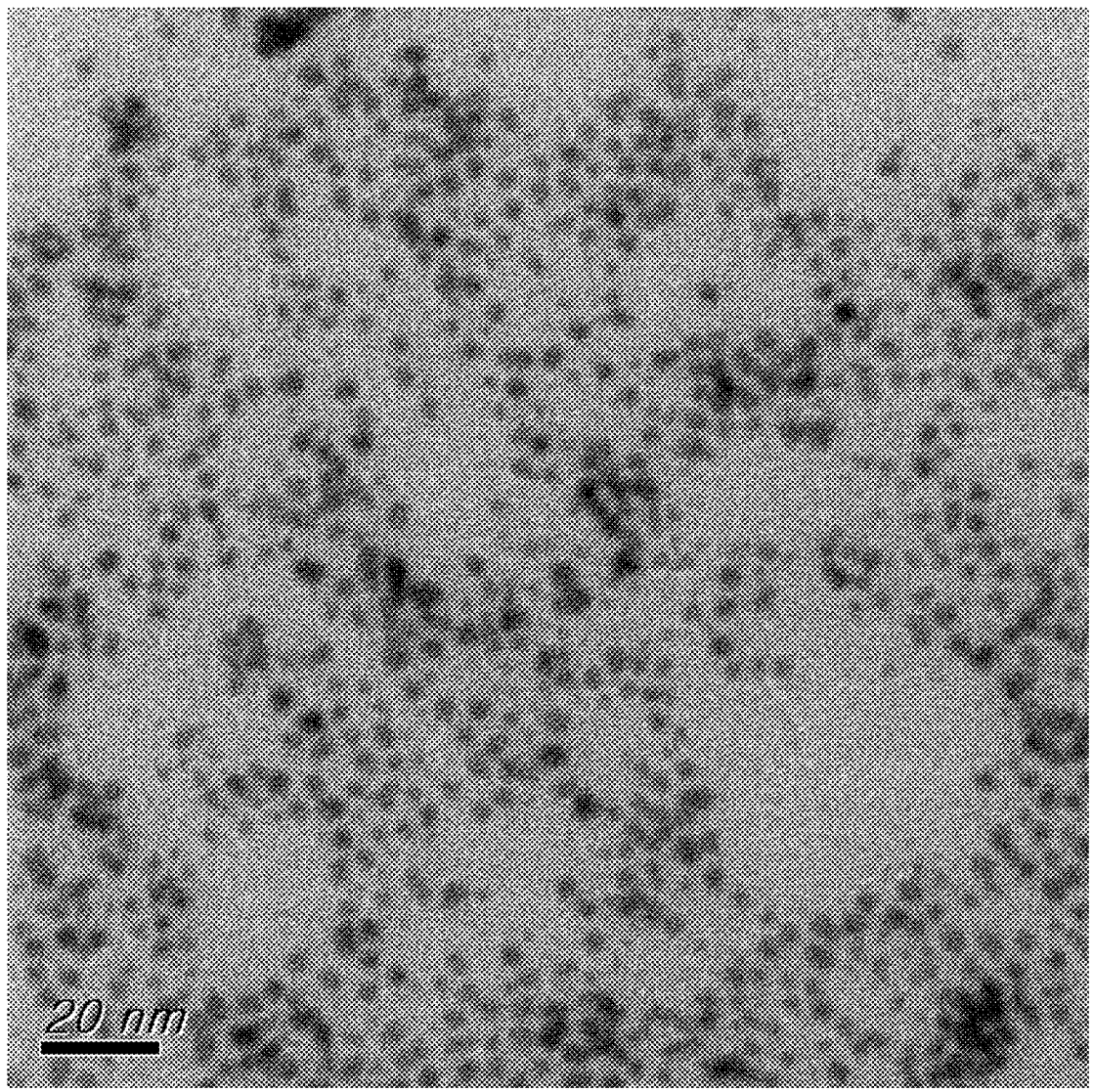

Finally, in step (c), 200 mL of an aqueous solution containing methyl lactate (800 mg, 7.7 mmol) as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 8. In addition, the resulting colloidal platinum nanoparticles were confirmed by the FT-IR spectrum as shown in FIG. 9. TEM images of the product of Example 5 were shown in FIGS. 11B-1 to 11B-3.

Example 6

Synthesis of Colloidal Platinum Nanoparticles Using Methyl Lactate and Citric Acid as the Combined Reducing Agent First, in step (a), platinum powders (19.5 mg, 0.10 mmol) and 1 mL of concentrated hydrochloric acid aqueous solution containing 36 wt % of HCl were placed in a 10 mL flat-bottomed flask. Then, 1 mL of aqueous solution containing $KClO_3$ (70 mg, 0.57 mmol) and $KClO_4$ (20 mg, 0.14 mmol) was added into the flat-bottomed flask to obtain a reaction mixture. The reaction mixture was stirred and heated at 60° C. for 10 minutes until all platinum powders were consumed to obtain an inorganic platinum solution containing potassium chloroplatinate.

Subsequently, in step (b), citric acid (60 mg, 0.31 mmol) and methyl lactate (31 mg, 0.3 mmol) were added into the flat-bottomed flask and mixed with the solution containing potassium chloroplatinate to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 10:
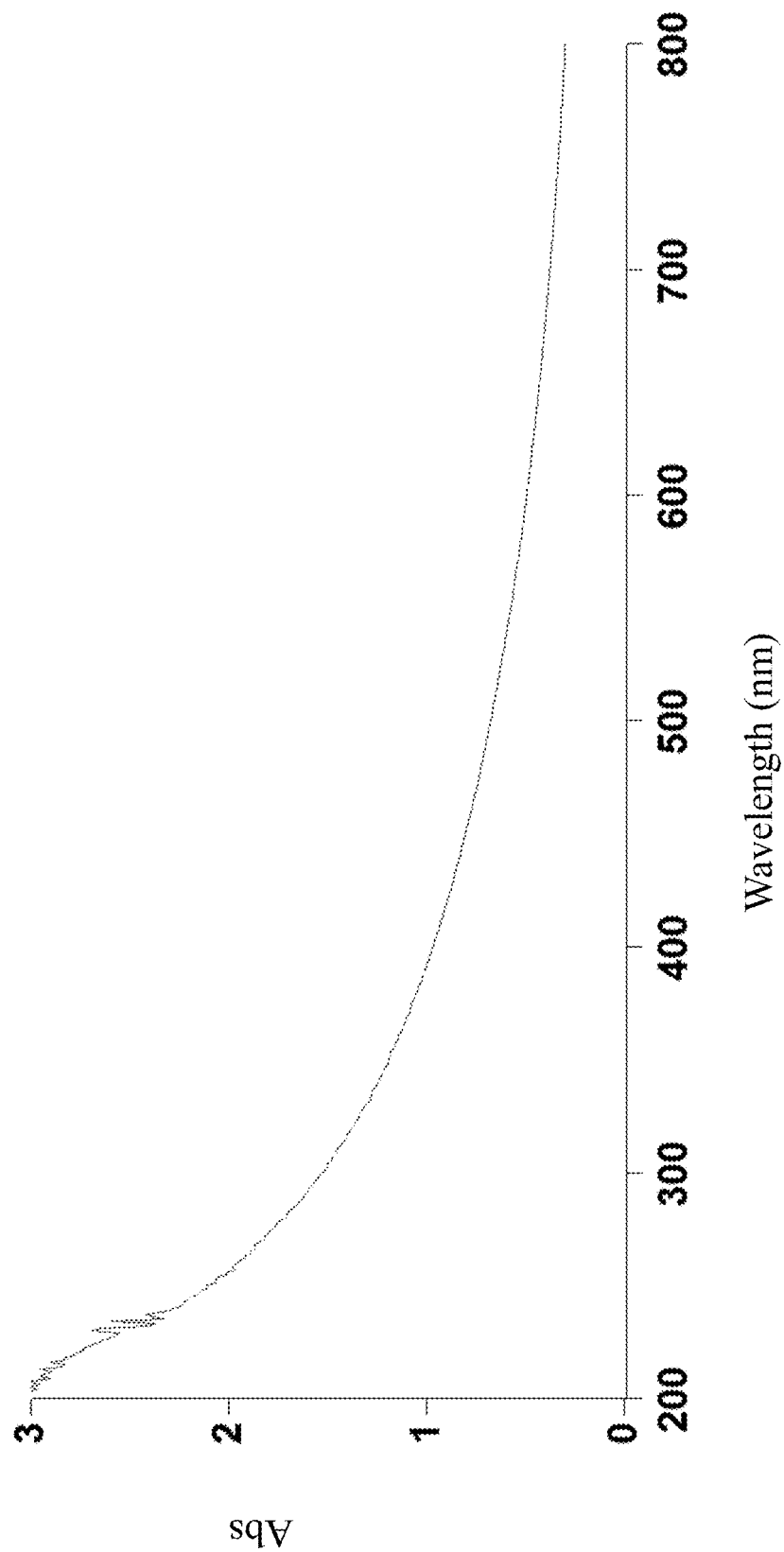
FIG. 10 is a UV-Vis spectrum of the colloidal platinum nanoparticles obtained in Example 6 of the instant disclosure.

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles whose UV-Vis absorption spectrum was shown in FIG. 10.

Example 7

Synthesis of Colloidal Platinum Nanoparticles Using Iodic Acid and Ammonium Perchlorate as the Combined Halogen-Containing Oxidizing Agent and Citric Acid as the Reducing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $HIO_3$ (20 mg, 0.11 mmol) and $NH_4ClO_4$ (52 mg, 0.44 mmol) was added into the flat-bottomed flask to obtain a reaction mixture. The reaction mixture was stirred and heated at 60° C. for 10 minutes until all platinum powders were consumed to obtain an inorganic platinum solution containing ammonium chloroplatinate [$(NH_4)_2PtCl_6$].

Subsequently, in step (b), citric acid (120 mg, 0.63 mmol) was added into the flat-bottomed flask and mixed with the solution containing $(NH_4)_2PtCl_6$ to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas and $NH_3$ gas; the amount of the residues was almost 3% by volume of the mixture solution.

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles.

Example 8

Synthesis of Colloidal Platinum Nanoparticles Using Citric Acid as the Reducing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (70 mg, 0.77 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate.

Subsequently, in step (b), citric acid (120 mg, 0.63 mmol) was added into the flat-bottomed flask and mixed with the solution containing sodium chloroplatinate to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles.

Example 9

Synthesis of Colloidal Platinum Nanoparticles Using γ-Butyrolactone as the Reducing Agent and Citric Acid as the Dispersing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (20 mg, 0.22 mmol) and $NaClO_3$ (60 mg, 0.57 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate.

Subsequently, in step (b), γ-butyrolactone (70 mg, 0.81 mmol) was added into the flat-bottomed flask and mixed with the solution containing sodium chloroplatinate to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Finally, in step (c), 200 mL of an aqueous solution containing citric acid (240 mg, 1.25 mmol) as the medium was added into the flat-bottomed flask to disperse the platinum nanoparticles in the flat-bottomed flask, and said solution was heated at 70° C. for 10 minutes to obtain colloidal platinum nanoparticles.

Example 10

Synthesis of Colloidal Platinum Nanoparticles Using Poly(Lactic Acid) (PLA) as the Reducing Agent and Citric Acid as the Dispersing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (72 mg, 0.80 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate.

Subsequently, in step (b), PLA (360 mg) was added into the flat-bottomed flask and mixed with the solution containing sodium chloroplatinate to form a mixture solution. Then, the flat-bottomed flask was placed on a hot plate and heated at 130° C. for 12 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Finally, in step (c), 200 mL of an aqueous solution containing citric acid (800 mg, 4.2 mmol) as the medium was added into the flat-bottomed flask to disperse the platinum nanoparticles in the flat-bottomed flask, and said solution was heated at 70° C. for 10 minutes to obtain colloidal platinum nanoparticles.

Practical Example 1 of Hyaluronic Acid-Colloidal Platinum Nanoparticles

Synthesis of Colloidal Platinum Nanoparticles Using Citric Acid as the Reducing Agent First, in step (a), platinum powders (19.2 mg, 0.10 mmol) and 1 mL of concentrated hydrochloric acid aqueous solution containing 36 wt % of HCl were placed in a 10 mL flat-bottomed flask. Then, 1 mL of aqueous solution containing $NaClO_2$ (20 mg, 0.22 mmol) and $NaClO_3$ (60 mg, 0.57 mmol) was added into the flat-bottomed flask to obtain a reaction mixture. The reaction mixture was stirred and heated at 60° C. for 10 minutes until all platinum powders were consumed to obtain an inorganic platinum solution containing sodium chloroplatinate.

Subsequently, in step (b), citric acid (200 mg, 1.04 mmol) was added into the flat-bottomed flask and mixed with the solution containing sodium chloroplatinate to form a mixture solution. Then, the flat-bottomed flask was placed on a hot plate and heated at 130° C. for 10 minutes to perform a reduction reaction. The reduction reaction produced a composition containing platinum nanoparticles, residues and HCl gas; the amount of the residues was almost 3% by volume of the mixture solution. During the reduction reaction, HCl gas produced therefrom was guided out through the recovery port attached to the flat-bottomed flask and was trapped with 40 mL water in an Erlenmeyer flask for collection.

Figure 13:
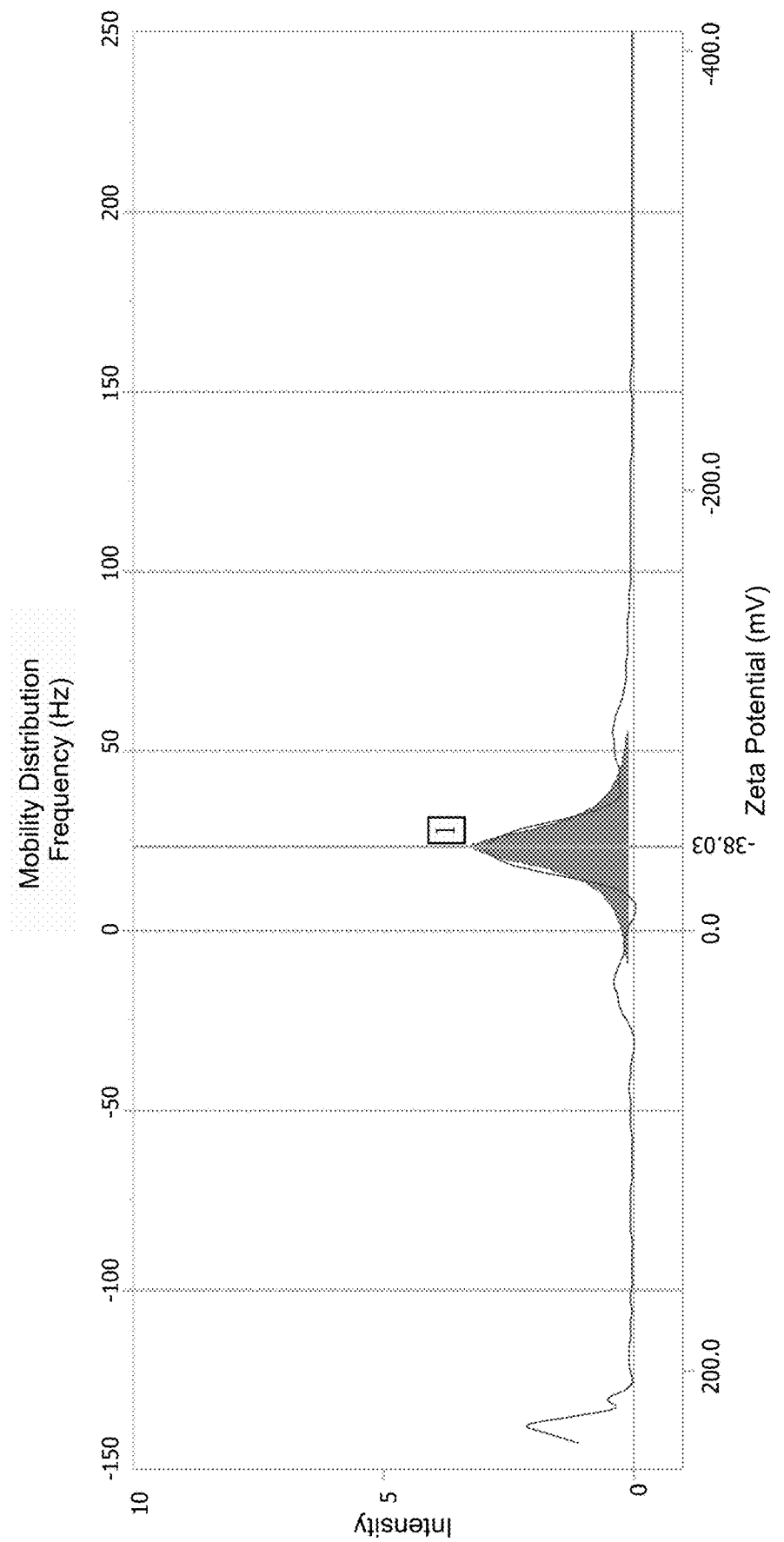
FIG. 13 is a zeta potential diagram of the colloidal platinum nanoparticles obtained in Practical Example 1 of the instant disclosure.

Finally, in step (c), 200 mL of water as the medium was added into the flat-bottomed flask to disperse the platinum nanoparticles in the flat-bottomed flask, and said solution was heated at 70° C. for 10 minutes to obtain colloidal platinum nanoparticles whose zeta potential was −38.03 mV as shown in FIG. 13.

After the colloidal platinum nanoparticles was cooled to room temperature (25° C.), 0.8 mL of said colloidal platinum nanoparticles was taken and mixed with 12 mL of an aqueous solution containing 2.3 wt % of hyaluronic acid, so as to obtain a clear light brown solution containing hyaluronic acid-colloidal platinum nanoparticles whose zeta potential was −32.86 mV.

Discussion of the Results

Based on the results of Examples 1 to 10, the instant disclosure directly employs platinum metal powders as the metal source. In the same reaction vessel, the platinum metal powders were dissolved by the halogen-containing oxidizing agent first, and next different kinds of reducing agents were used to form platinum nanoparticles, and then diverse kinds of mediums were added to disperse said platinum nanoparticles to obtain colloidal platinum nanoparticles. Compared with the conventional methods, the method of the instant disclosure does not have to produce and purify chloroplatinic acid or chloroplatinate salts. The instant disclosure can make the platinum powders as the starting material converted to colloidal platinum nanoparticles through consecutive steps in a same reaction vessel without transferring containers in the middle. Hence, the instant disclosure does not include complicated procedures, so it has advantages of simplicity, low loss, and high yield.

From the comparison of ICP-OES results of Comparative Example 1 and Example 1, the colloidal platinum nanoparticles made from Example 1 have higher purity than the colloidal platinum nanoparticles made from Comparative Example 1. That is because Comparative Example 1 adopts crude chloroplatinic acid as the raw material which is obtained from using aqua regia to dissolve the platinum powders without undergoing further refining steps such as concentration and recrystallization. As a result, the colloidal platinum nanoparticles made from Comparative Example 1 contain higher concentration of metal impurities. By contrast, the method of Example 1 of the instant disclosure adopts the halogen-containing oxidizing agent to dissolve the platinum powders, and directly gets highly pure chloroplatinic acid which does not need to undergo a cumbersome refining step. The technical means of the instant disclosure can simplify the process and ensure that the obtained colloidal platinum nanoparticles have a high purity. Accordingly, it demonstrates that the instant disclosure, by using the halogen-containing oxidizing agent to dissolve the platinum powders, has the advantages of time-effectiveness, cost-effectiveness and high quality of the product compared to the conventional method of dissolving platinum by aqua regia.

Further, the method of Examples 1 to 10 uses non-toxic and biocompatible reducing agents of citric acid, glycerol, lactic acid, poly(ethylene glycol), and esters including methyl lactate, γ-butyrolactone or poly(lactic acid). It is more eco-friendly and suitable to be applied in the present society.

From the comparison of FIG. 5 of Example 2 and FIG. 6 of Example 3, said all-wavelength UV-Vis absorption spectra in FIGS. 5 and 6 are obviously different, so it demonstrates that selection of different dispersing media for the platinum nanoparticles makes colloidal platinum nanoparticles have different characteristics. As nanonization and colloidalization of the platinum nanoparticles are processed by two steps, wider ranges of both reducing agents and dispersing medium are applicable to the method of the instant disclosure. Accordingly, it is more convenient to apply in various industrial and medical applications.

Compared with the conventional process, the concentration of platinum ions derived from the inorganic platinum compound is relatively high in Examples 1 to 10 because of the low solution volume in the reaction vessel by heating and evaporating the mixture solution during the reduction reaction. That is conducive to enhance the collision probability of reactant molecules and thereby accelerate the reaction rate. Further, by means of guiding the gas such produced from the reduction reaction out of the reaction vessel at the same time, it facilitates proceeding of the forward reaction, and therefore the reaction time for making metal nanoparticles can be shortened to within 20 minutes, even merely 10 minutes. This is a cost-effective process, and faster reaction rate of reduction yields a narrower size distribution of metal nanoparticles. Accordingly, said platinum nanoparticles in homogeneous size distribution do not require further filtration, so the yield can improve.

Unlike the conventional method that involves a hazardous process in adding a solution containing platinum ions rapidly to a boiling solution of reducing agent, the instant disclosure by heating a pre-mixed solution of the solution containing the inorganic platinum compound and reducing agents even in a large scale is a much safer manner. Moreover, the instant disclosure proceeds in an easy and efficient manner by just using simple setup without complicated apparatus of reactor or stirring equipment apparatus.

Further, using organic reducing and dispersing agents in water makes colloidal platinum nanoparticles have good quality and stability.

Besides, the anions (e.g. Cl$^-$) can be guided out of the reaction vessel in a form of gas (e.g. HCl) by heating in step (b) of the instant disclosure. Subsequently, said gas can be trapped by water for reuse. As most anions can be removed from the colloidal platinum nanoparticles, said colloidal platinum nanoparticles have high stability and zeta potential without appreciable interference of anions.

Based on the result of Practical Example 1, the product containing hyaluronic acid-colloidal platinum nanoparticles made by the method of the instant disclosure has a −32.86 mV of zeta potential, which is near the zeta potential (−32.03 mV) of the colloidal platinum nanoparticles as the raw material. It demonstrates that the colloidal platinum nanoparticles made by the instant disclosure have good quality and stability without the interference of anions. As a result, the colloidal platinum nanoparticles can be applied to derive other colloidal platinum products through a quite easy and fast process.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of making colloidal platinum nanoparticles, comprising three consecutive steps:
   step (a): mixing and heating platinum powders and a hydrochloric acid aqueous solution containing a halogen-containing oxidizing agent in a reaction vessel to dissolve the platinum powders, so as to obtain an inorganic platinum solution, wherein the inorganic platinum solution contains an inorganic platinum compound comprising chloroplatinic acid, sodium chloroplatinate, potassium chloroplatinate, or ammonium chloroplatinate;
   step (b): adding a reducing agent into the inorganic platinum solution in the reaction vessel to form a mixture solution and heating the mixture solution to undergo a reduction reaction and produce a composition containing platinum nanoparticles, residues and a gas, and guiding the gas out of the reaction vessel, wherein an amount of the residues is less than 15% by volume of the mixture solution; and
   step (c): adding a medium into the reaction vessel to disperse the platinum nanoparticles, so as to obtain the colloidal platinum nanoparticles;
   wherein the consecutive steps (a) to (c) are performed in the same reaction vessel to make the colloidal platinum nanoparticles;
   wherein the reducing agent comprises at least one ester selected from the group consisting of carboxylate ester, cyclic ester, polymeric ester, and any combination thereof;
   wherein the carboxylate ester is represented by the formula (I),

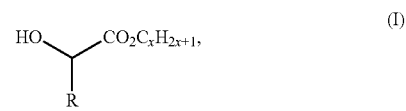

wherein R is H or CH$_3$, and x is an integer ranging from 1 to 16;
the cyclic ester is represented by the formula (II),

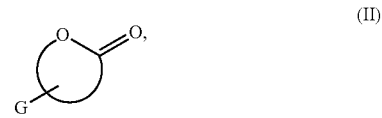

wherein the ring contains one oxygen atom and 4 to 6 carbon atoms, and G is H, CH$_3$ or C$_2$H$_5$; and
the polymeric ester is represented by the formula (III),

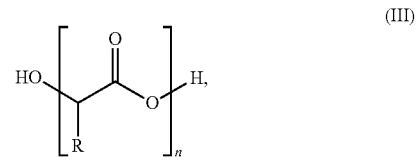

wherein R is H or CH$_3$, and n is an integer ranging from 2 to 1400.

2. The method as claimed in claim 1, wherein the halogen-containing oxidizing agent is selected from the group consisting of: $HXO_n$, $MXO_n$, $X_pO_q$, and any combination thereof;
- wherein X is Cl, Br, or I;
- M is K, Na or $NH_4$;
- n is an integer 1, 2, 3 or 4;
- p is an integer 1 or 2; and
- q is an integer 1, 2, 3, or 5.

3. The method as claimed in claim 1, wherein the step of guiding the gas out of the reaction vessel in step (b) comprises guiding the gas produced from the reduction reaction and trapping the gas with water in a tank.

4. The method as claimed in claim 1, wherein a heating temperature in step (a) ranges from 40° C. to 100° C.

5. The method as claimed in claim 1, wherein a heating temperature in step (b) ranges from 50° C. to 150° C.

6. The method as claimed in claim 1, wherein a heating temperature in step (b) ranges from 70° C. to 130° C.

7. The method as claimed in claim 1, wherein a dispersion temperature in step (c) ranges from 20° C. to 100° C.

8. The method as claimed in claim 1, wherein a dispersion temperature in step (c) ranges from 50° C. to 80° C.

9. The method as claimed in claim 1, wherein the reducing agent further comprises citric acid, lactic acid, glycolic acid, ascorbic acid, oxalic acid, tartaric acid, 1,4-butanediol, glycerol, poly(ethylene glycol), hydroquinone, acetaldehyde, glucose, cellulose, carboxymethyl cellulose, cyclodextrin, chitin, chitosan, or any combination thereof.

10. The method as claimed in claim 1, wherein when the reducing agent is the carboxylate ester, the cyclic ester or a combination of the carboxylate ester and the cyclic ester, or when the reducing agent comprises the carboxylate ester, the cyclic ester or a combination of the carboxylate ester and the cyclic ester, and the reducing agent further comprises citric acid, lactic acid, glycolic acid, ascorbic acid, oxalic acid, tartaric acid, 1,4-butanediol, glycerol, hydroquinone, acetaldehyde, glucose, and any combination thereof, a molar ratio of the reducing agent relative to the inorganic platinum compound ranges from 1 to 40.

11. The method as claimed in claim 1, wherein the medium in step (c) comprises an aqueous solution including a dispersing agent; wherein the dispersing agent comprises citric acid, lactic acid, poly(lactic acid), sodium hydroxide, hexadecylamine, oleylamine, tetraoctylammonium bromide, dodecanethiol, poly(ethylene glycol), polyvinylpyrrolidone, or any combination thereof.

12. The method as claimed in claim 11, wherein a molar concentration of the dispersing agent ranges from 0.001 M to 0.1 M.

13. The method as claimed in claim 11, wherein a molar ratio of the dispersing agent relative to the platinum nanoparticles ranges from 1 to 100.

14. The method as claimed in claim 11, wherein a molar ratio of the dispersing agent relative to the platinum nanoparticles ranges from 3 to 30.

* * * * *